United States Patent
Li et al.

(10) Patent No.: US 11,412,235 B2
(45) Date of Patent: Aug. 9, 2022

(54) COLOR TRANSFORM FOR VIDEO CODING

(71) Applicant: Tencent America LLC, Palo Alto, CA (US)

(72) Inventors: Ling Li, Seoul (KR); Xin Zhao, Santa Clara, CA (US); Xiang Li, Saratoga, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/035,218

(22) Filed: Sep. 28, 2020

(65) Prior Publication Data

US 2021/0112258 A1 Apr. 15, 2021

Related U.S. Application Data

(60) Provisional application No. 62/913,486, filed on Oct. 10, 2019.

(51) Int. Cl.
| | |
|---|---|
| *H04N 19/186* | (2014.01) |
| *H04N 19/124* | (2014.01) |
| *H04N 19/176* | (2014.01) |
| *H04N 19/70* | (2014.01) |
| *H04N 19/136* | (2014.01) |

(52) U.S. Cl.
CPC ......... *H04N 19/186* (2014.11); *H04N 19/124* (2014.11); *H04N 19/136* (2014.11); *H04N 19/176* (2014.11); *H04N 19/70* (2014.11)

(58) Field of Classification Search
CPC ..... H04N 19/70; H04N 19/186; H04N 19/169
See application file for complete search history.

(56) References Cited

U.S. PATENT DOCUMENTS

| | | |
|---|---|---|
| 2009/0003690 A1 | 1/2009 | Jiao et al. |
| 2014/0376611 A1 | 12/2014 | Kim et al. |
| 2015/0264364 A1* | 9/2015 | Zhang .............. H04N 19/12 375/240.18 |

(Continued)

OTHER PUBLICATIONS

"Macroblock-Adaptive Residual Color Space Transforms for 4:4:4 Video Coding"—Detlev Marpe, Heiner Kirchhoffer, Valeri George, Peter Kauff and Thomas Wiegand; 2006 International Conference on Image Processing, DOI: 10.1109/ICIP.2006.313039, Feb. 20, 2007. (Year: 2007).*

(Continued)

*Primary Examiner* — Mainul Hasan
(74) *Attorney, Agent, or Firm* — ArentFox Schiff LLP

(57) ABSTRACT

A method of video decoding performed in a video decoder includes receiving a syntax element from a bitstream of a coded video. The syntax element can indicate that residual blocks of a current coding unit (CU) are processed with a color space conversion. The residual blocks of the current CU can include a luma residual block, a first chroma residual block, and a second chroma residual block. In response to receiving the syntax element indicating that the residual blocks of the current CU are processed with the color space conversion, one of two options of color space conversion equations can be selected. An inverse color space conversion using the selected option of color space conversion equations can be applied to the residual blocks of the current CU to generate modified versions of the residual blocks of the current CU.

15 Claims, 23 Drawing Sheets

(56) References Cited

U.S. PATENT DOCUMENTS

| | | | | |
|---|---|---|---|---|
| 2015/0264374 A1* | 9/2015 | Xiu | ............... | H04N 19/46 |
| | | | | 375/240.25 |
| 2015/0264405 A1* | 9/2015 | Zhang | ............ | H04N 19/134 |
| | | | | 375/240.18 |
| 2015/0358631 A1* | 12/2015 | Zhang | ............ | H04N 19/176 |
| | | | | 375/240.16 |
| 2015/0373327 A1* | 12/2015 | Zhang | ............. | H04N 19/70 |
| | | | | 375/240.03 |
| 2016/0100167 A1 | 4/2016 | Rapaka et al. | | |
| 2016/0261865 A1* | 9/2016 | Li | ............... | H04N 19/176 |
| 2016/0261884 A1 | 9/2016 | Li et al. | | |
| 2016/0330457 A1* | 11/2016 | Ye | ............... | H04N 19/187 |
| 2020/0288159 A1* | 9/2020 | Van der Auwera | .. | H04N 19/105 |

OTHER PUBLICATIONS

Adaptive Color-Space Transform in HEVC Screen Content Coding—Li Zhang, Xiaoyu Xiu, Jianle Chen, Marta Karczewicz, Yunwen He, Yan Ye, Jizheng Xu, Joel Sole, and Woo-Shik Kim; IEEE Journal On Emerging and Selected Topics in Circuits and Systems, vol. 6, No. 4, Dec. 2016. (Year: 2016).*

International Search Report and Written Opinion dated Jan. 22, 2021 in International Application No. PCT/US 20/53792, 15 pgs.

* cited by examiner

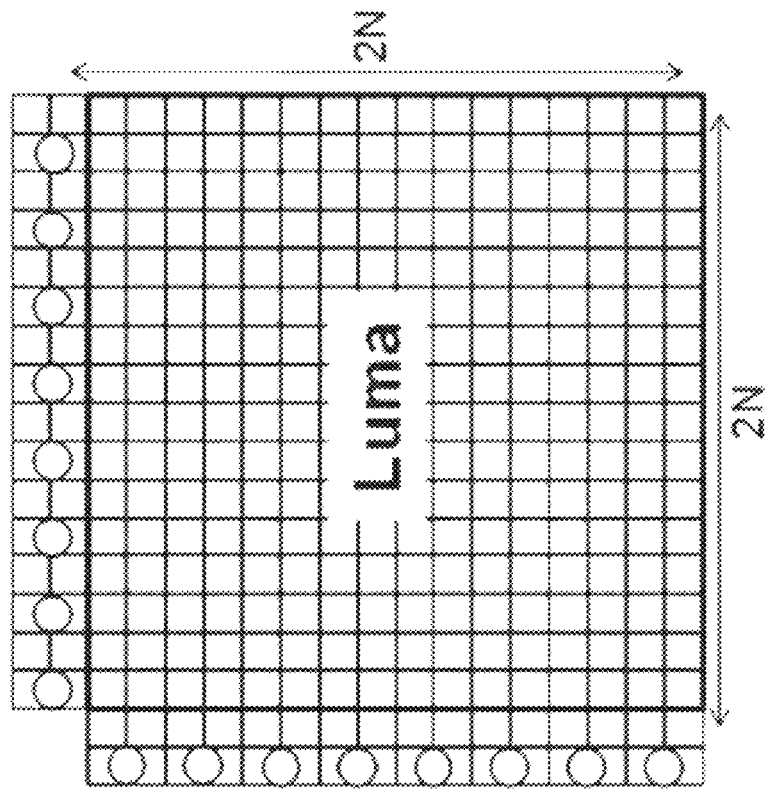
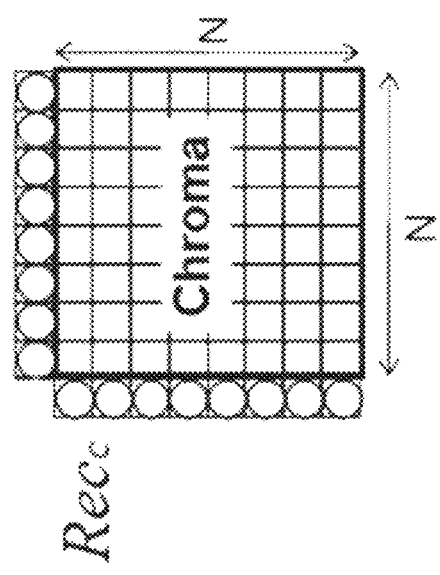
FIG. 14B
FIG. 14A

COLOR TRANSFORM FOR VIDEO CODING

INCORPORATION BY REFERENCE

This present disclosure claims the benefit of priority to U.S. Provisional Application No. 62/913,486, "Improved Color Transform In VVC" filed on Oct. 10, 2019, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

The intra prediction modes used in HEVC are illustrated in FIG. 1B. In HEVC, there are total 35 intra prediction modes, among which mode 10 is horizontal mode, mode 26 is vertical mode, and mode 2, mode 18 and mode 34 are diagonal modes. The intra prediction modes are signalled by three most probable modes (MPMs) and 32 remaining modes.

FIG. 1C illustrates the intra prediction modes used in VVC. In VVC, there are total 95 intra prediction modes as shown in FIG. 1C, where mode 18 is the horizontal mode, mode 50 is the vertical mode, and mode 2, mode 34 and mode 66 are diagonal modes. Modes −1~−14 and Modes 67~80 are called Wide-Angle Intra Prediction (WAIP) modes.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving MPMs, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate) of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1D, a current block (110) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using. The order of forming a candidate list may be A0→B0→B1→A1→B2.

SUMMARY

Aspects of the disclosure provide a method of video decoding performed in a video decoder. A syntax element can be received from a bitstream of a coded video. The syntax element can indicate that residual blocks of a current coding unit (CU) are processed with a color space conversion. The residual blocks of the current CU can include a luma residual block, a first chroma residual block, and a second chroma residual block. In response to receiving the syntax element indicating that the residual blocks of the current CU are processed with the color space conversion, one of two options of color space conversion equations can be selected. An inverse color space conversion using the selected option of color space conversion equations can be applied to the residual blocks of the current CU to generate modified versions of the residual blocks of the current CU.

In an embodiment, the two options of color space conversion equations include a first option of color space conversion equations including:

$$tmp=rY[x][y]-(rCb[x][y]\gg 1),$$

$$rY[x][y]=tmp+rCb[x][y],$$

$$rCb[x][y]=tmp-(rCr[x][y]\gg 1), \text{ and}$$

$$rCr[x][y]=rCb[x][y]+rCr[x][y],$$

and a second option of color space conversion equations including:

$$tmp=rY[x][y]-rCb[x][y],$$

$$rY[x][y]=rY[x][y]+rCb[x][y],$$

$$rCb[x][y]=tmp-rCr[x][y], \text{ and}$$

$$rCr[x][y]=tmp+rCr[x][y].$$

Inputs to each option of color space conversion equations include an array of luma residual samples of the luma residual block with elements rY[x][y], an array of chroma residual samples of the first chroma residual block with elements rCb[x][y], and an array of chroma residual samples of the second chroma residual block with elements rCb[x][y]. Outputs from each option of color space conversion equations include a modified array of luma residual samples of the luma residual block with elements rY[x][y], a modified array of chroma residual samples of the first chroma residual block with elements rCb[x][y], and a modified array of chroma residual samples of the second chroma residual block with elements rCb[x][y].

In an embodiment, the first option of color space conversion equations is selected when a transform skip flag corresponding to each of the residual blocks of the current CU has a value of 1. In an embodiment, the second option of color space conversion equations is selected when at least one of transform skip flags corresponding to the residual blocks of the current CU has a value of 0.

In an embodiment, the first option of color space conversion equations is selected when a transform skip flag corresponding to each of the residual blocks of the current has a value of 1 and a quantization parameter (QP) corresponding to each of the residual blocks of the current CU has a value of 4. In an embodiment, the second option of color space conversion equations is selected when at least one of QPs corresponding to the residual blocks of the current CU has a value not equal to 4.

In an embodiment, a syntax element is received that indicates only the first option of color space conversion equations is applied. The syntax element is one of a slice level syntax element, a picture level syntax element, or a sequence level syntax element. In an embodiment, a syntax element is received that indicates only the first option of color space conversion equations is applied regardless of a value of a flag indicating whether transform and quantization are bypassed for residuals of a CU. The syntax element is one of a slice level syntax element, a picture level syntax element, or a sequence level syntax element.

In an embodiment, one of two options of color space conversion equations is selected according to a value of a transform skip flag corresponding to each of the residual blocks of the current CU. In an embodiment, one of two options of color space conversion equations is elected according to a variable indicating whether a block-based differential pulse code modulation (BDPCM) is applied to the current CU.

An embodiment of the method can further include determining no color space conversion is applied to residual blocks of a CU when a bit depth of luma samples of the CU is different from a bit depth of chroma samples of the CU. An embodiment of the method can further include determining no color space conversion is applied to residual blocks of a CU when a bit depth of luma samples of the CU is different from a bit depth of chroma samples of the CU, and a transform skip flag corresponding to each of residual blocks of the CU has a value of 1 or 0. An embodiment of the method can further include determining no color space conversion is applied to residual blocks of a CU when a bit depth of luma samples of the CU is different from a bit depth of chroma samples of the CU, a QP corresponding to each of residual blocks of the CU has a value of 4, and a transform skip flag corresponding to each of the residual blocks of the CU has a value of 1 or 0.

Aspects of the disclosure provide an apparatus of video decoding. The apparatus can includes circuitry configured to receive a syntax element from a bitstream of a coded video indicating that residual blocks of a current CU are processed with a color space conversion. The residual blocks of the current CU can include a luma residual block, a first chroma residual block, and a second chroma residual block. In response to receiving the syntax element indicating that the residual blocks of the current CU are processed with the color space conversion, one of two options of color space conversion equations can be selected. An inverse color space conversion using the selected option of color space conversion equations can be applied to the residual blocks of the current CU to generate modified versions of the residual blocks of the current CU.

Aspects of the disclosure provide a non-transitory computer-readable medium storing instructions that, when executed by a processor, cause the processor to perform the method of video decoding.

BRIEF DESCRIPTION OF THE DRAWINGS

Further features, the nature, and various advantages of the disclosed subject matter will be more apparent from the following detailed description and the accompanying drawings in which:

FIGS. 14A and 14B illustrate locations of samples used for derivation of $\alpha$ and $\beta$ in LT_CCLM in accordance with an embodiment.

DETAILED DESCRIPTION OF EMBODIMENTS

I. Video Encoder and Decoder System

Figure 1A:
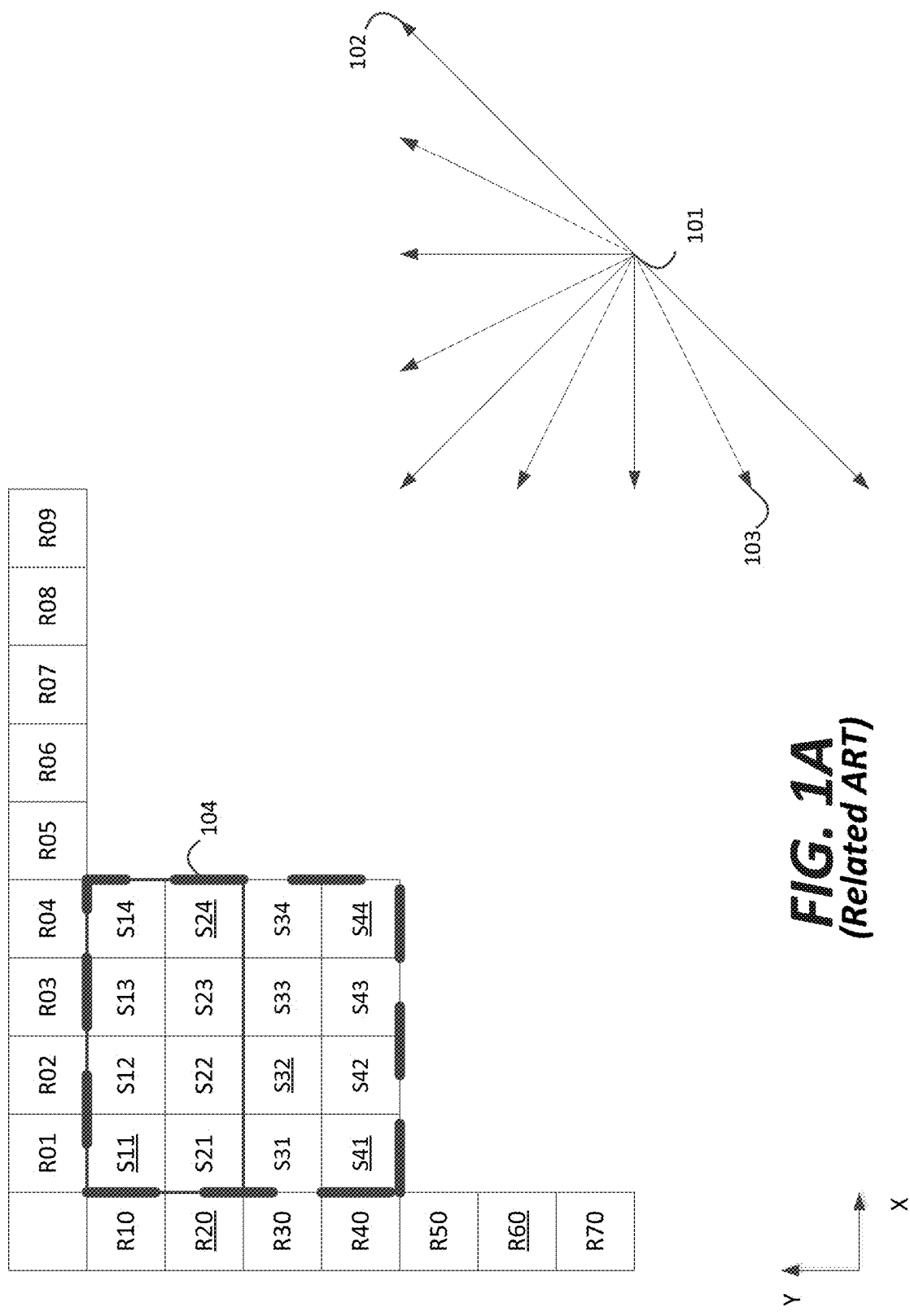
FIG. 1A is a schematic illustration of an exemplary subset of intra prediction modes.
Figure 1B:
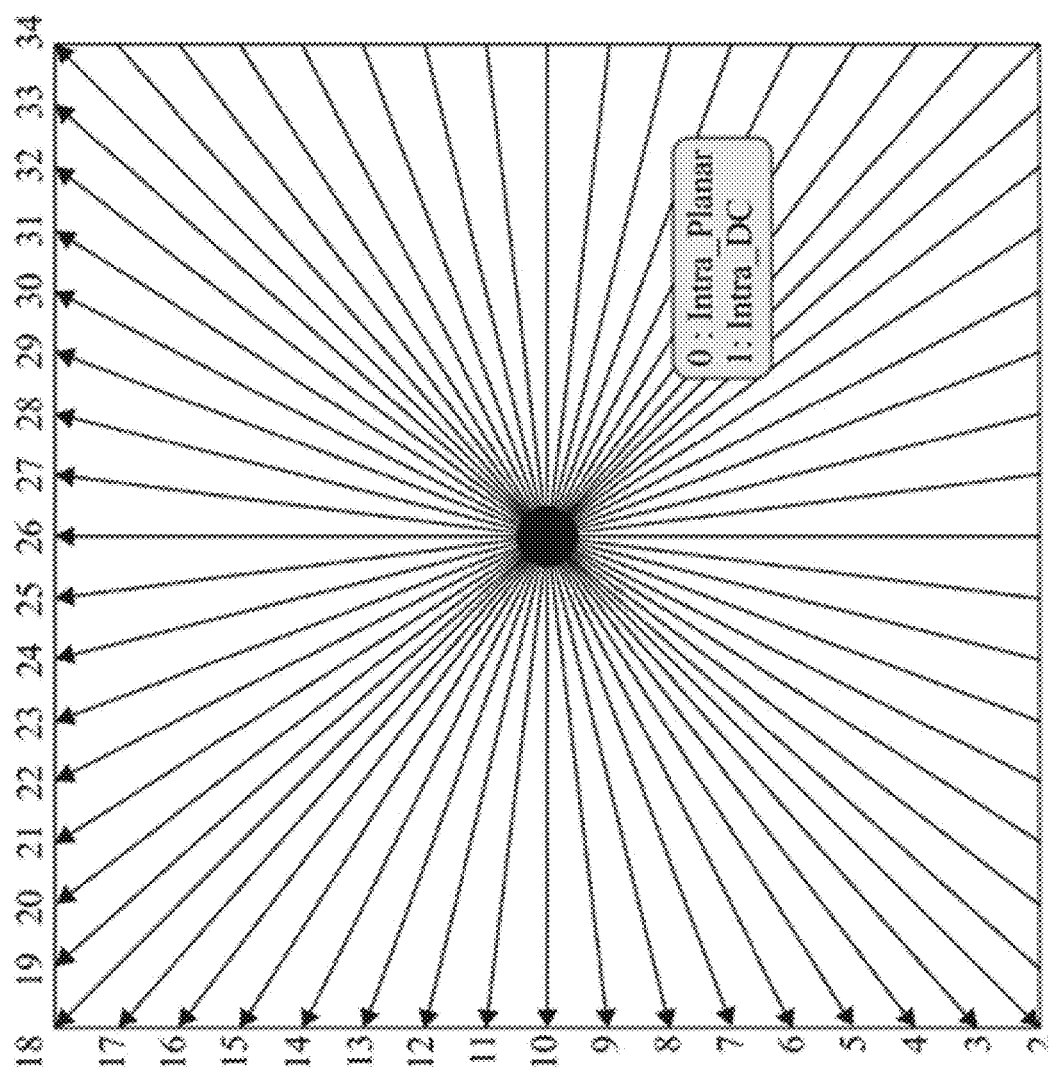
FIG. 1B is an illustration of exemplary intra prediction directions.
Figure 1C:
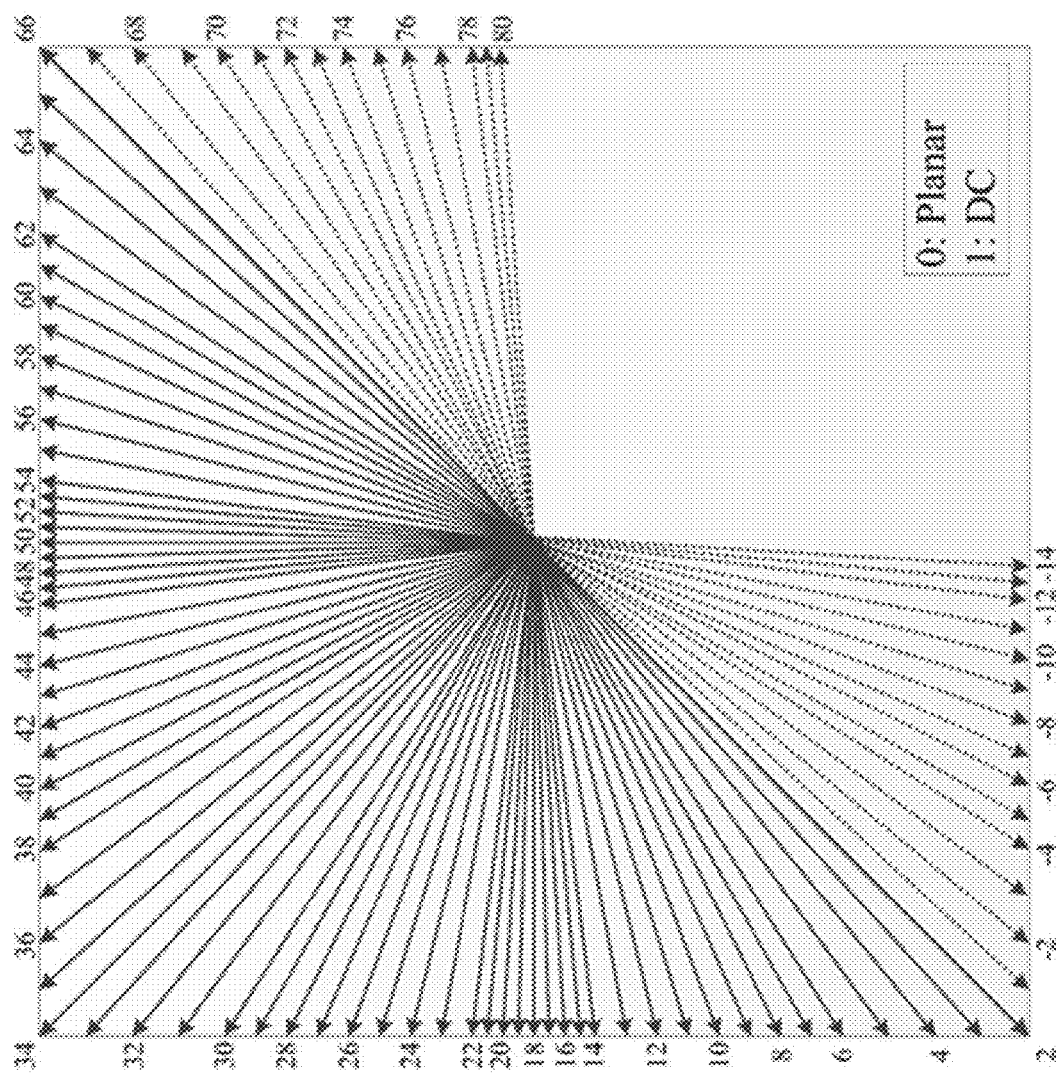
FIG. 1C is an illustration of exemplary intra prediction directions.
Figure 1D:
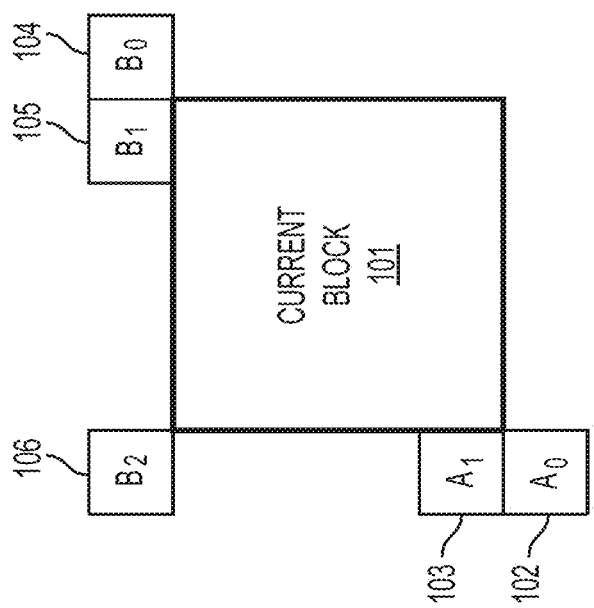
FIG. 1D is a schematic illustration of a current block and its surrounding spatial merge candidates in one example.
Figure 2:
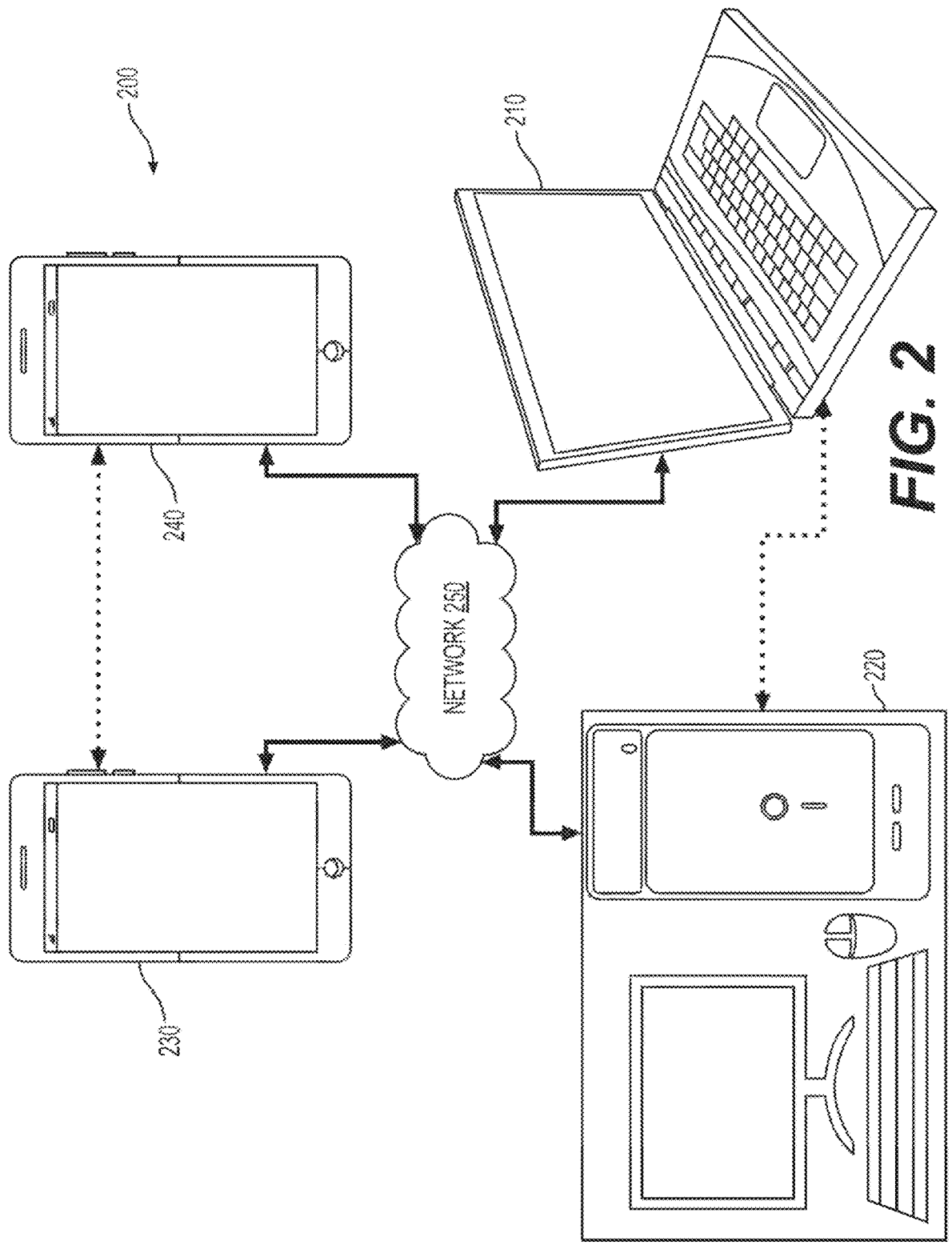
FIG. 2 is a schematic illustration of a simplified block diagram of a communication system in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
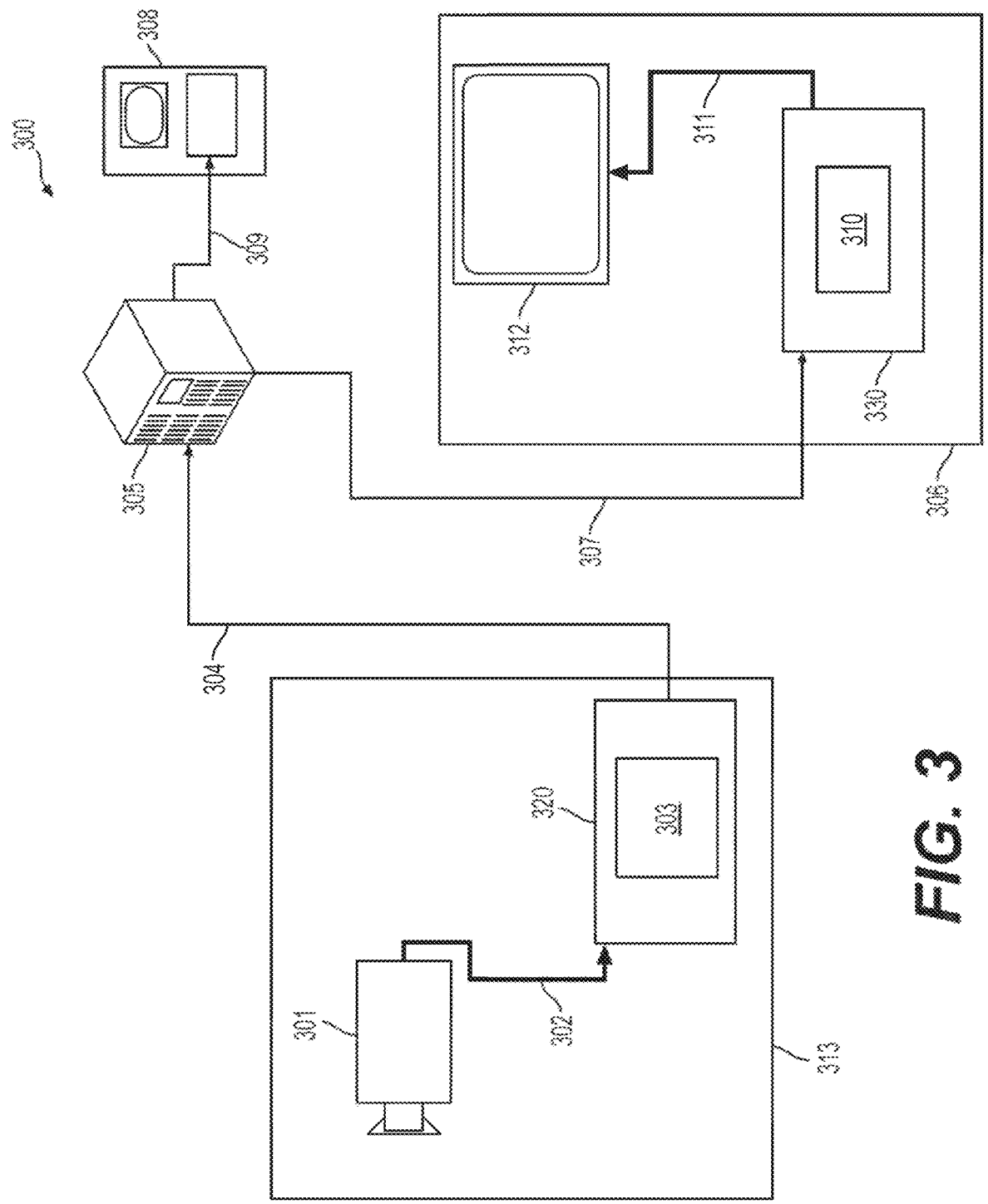
FIG. 3 is a schematic illustration of a simplified block diagram of a communication system in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
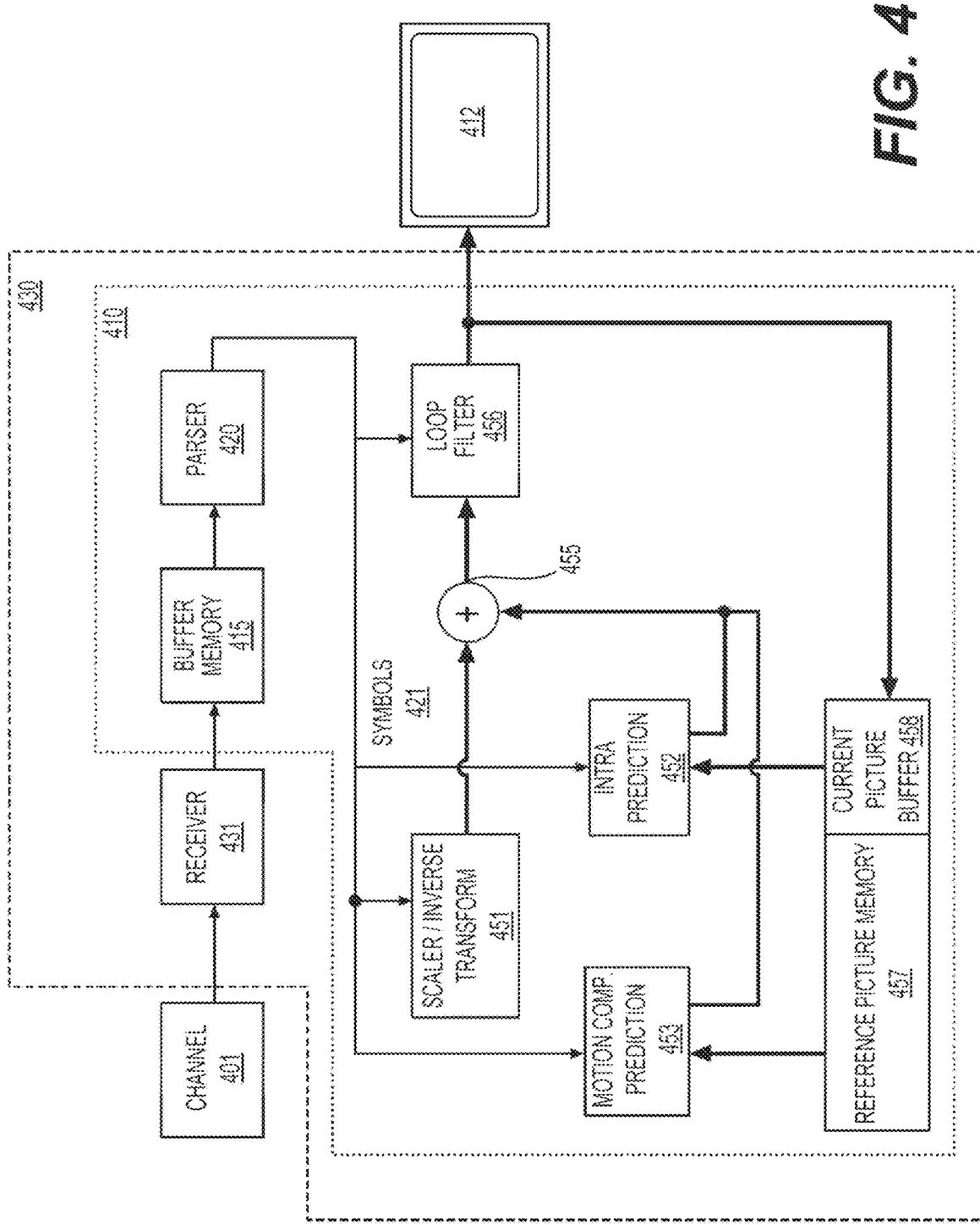
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
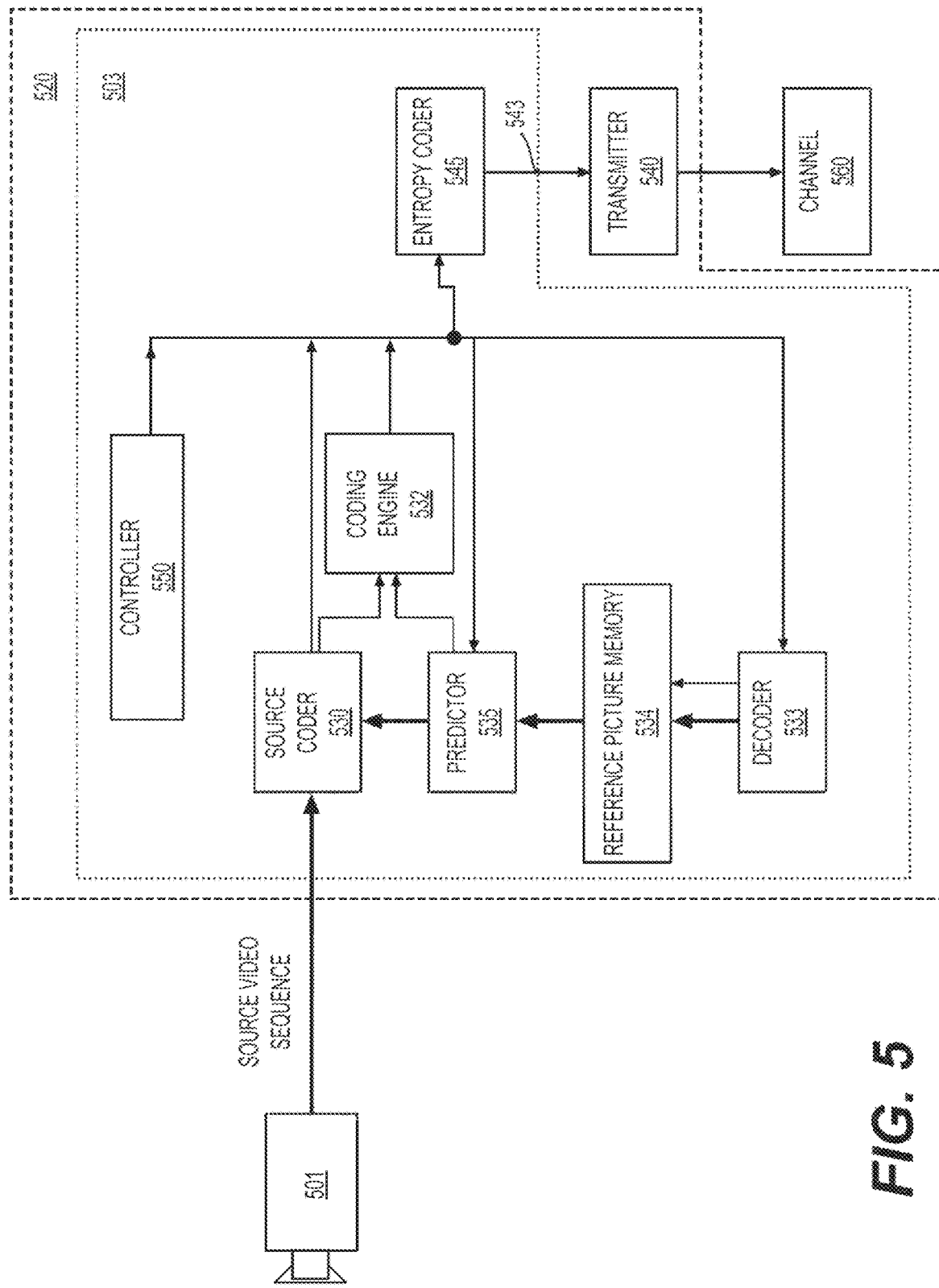
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. Ina videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
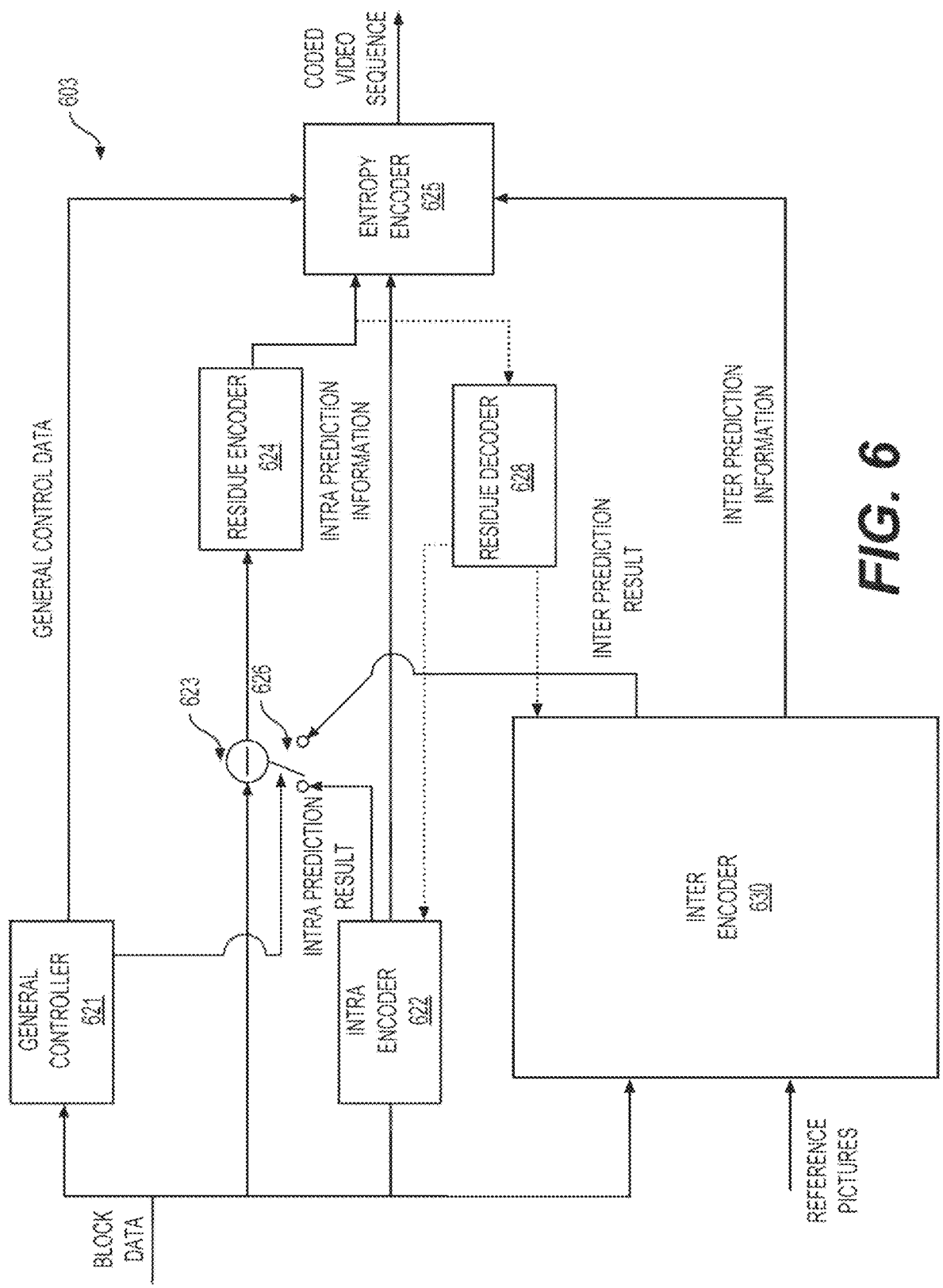
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
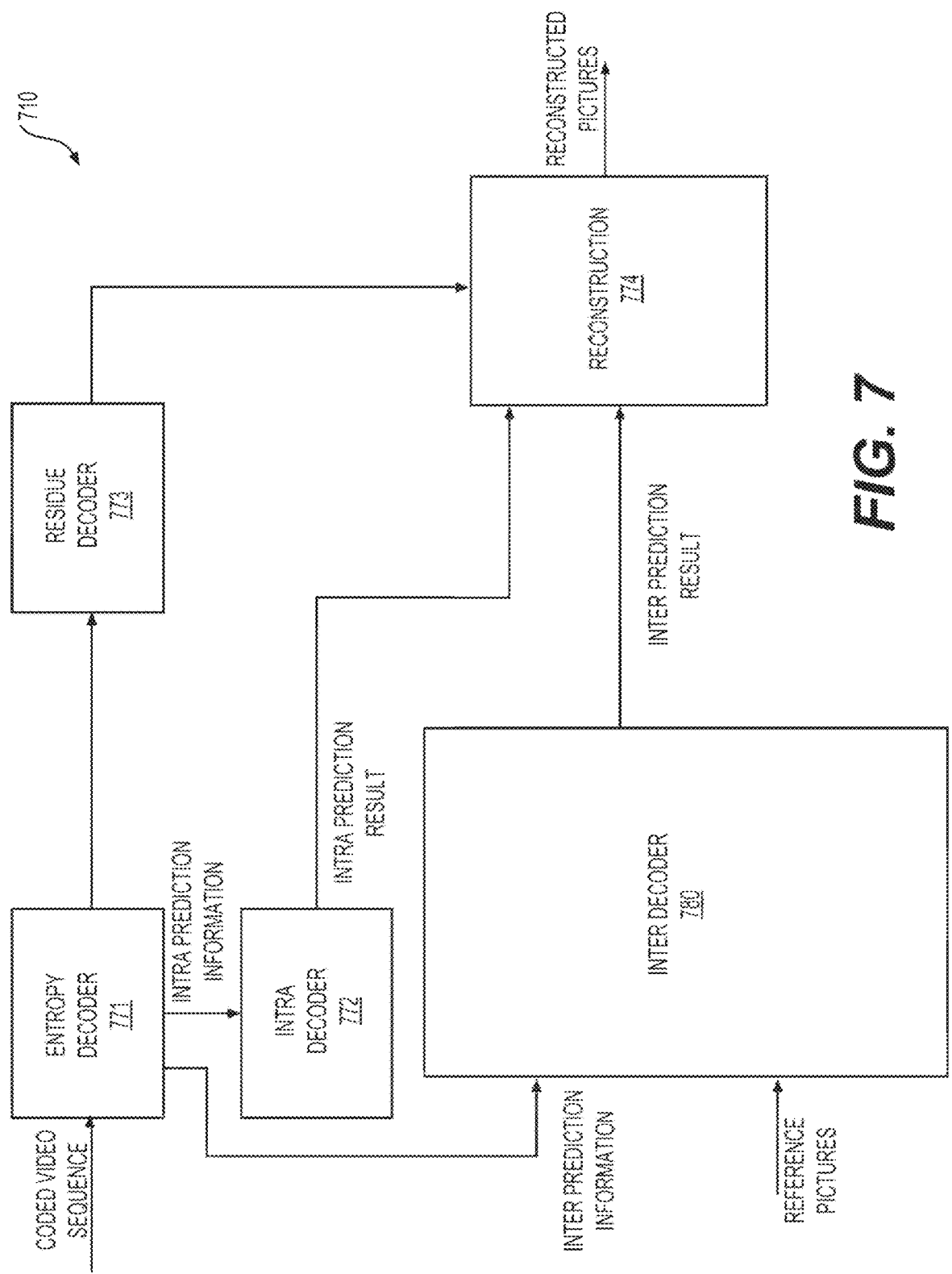
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

II. Tree-Structure Based Block Partitioning

According to some embodiments, a CTU is split into CUs by using a quad tree binary tree (QTBT) structure denoted as a coding tree to adapt to various local characteristics of individual blocks included in the CUs. The decision whether to code a picture area using inter-picture (temporal) or intra-picture (spatial) prediction may be performed at the CU level. Each CU may be further split into one, two or four PUs according to a PU splitting type. In some embodiments, inside one PU, the same prediction process is applied and the relevant information is transmitted to the decoder on a PU basis. After obtaining the residual block by applying the prediction process based on the PU splitting type, a CU may be partitioned into TUs according to another quad tree structure similar to the quad tree structure used for the coding tree for the CTU. In some other embodiments, a PU contains only one TU that has the same shape as the PU.

The coding tree for the CTU may include multiple partition types including CU, PU, and TU. In some embodiments, a CU or a TU is only a square shape, while a PU may be square or rectangular shape for an inter predicted block. In other embodiments, rectangular shaped CUs, PUs, and TUs are permitted. At a picture boundary, an implicit quad tree split may be applied so that a block will keep quad tree splitting until the size of the split block fits the picture boundary. According to some embodiments, an implicit split means that a split flag is not signaled but implied instead. For example, implicit QT means only a QT split is allowed for a picture boundary block. As such, the split flag is not signaled at the picture boundary. As an another example, when only a BT split is allowed at the picture boundary, the implicit split is the binary split. In some embodiments, when both QT and BT are allowed at the picture boundary, there is no implicit split, and the split method is explicitly signaled.

Figure 8A:
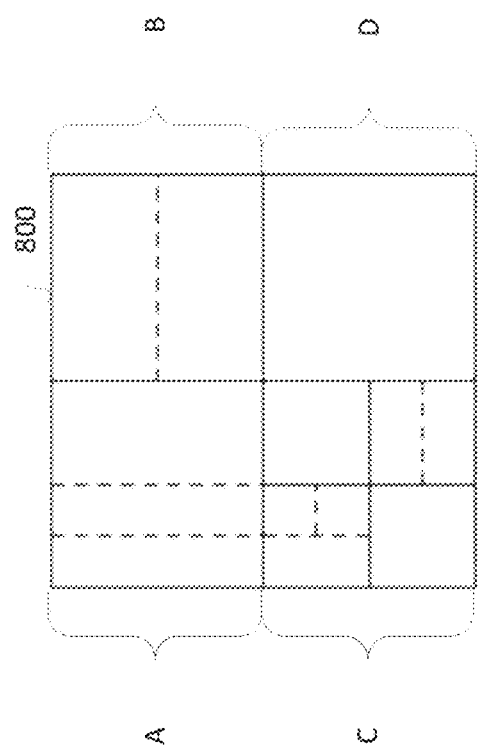
FIG. 8A shows block partitioning in accordance with an embodiment.
Figure 8B:
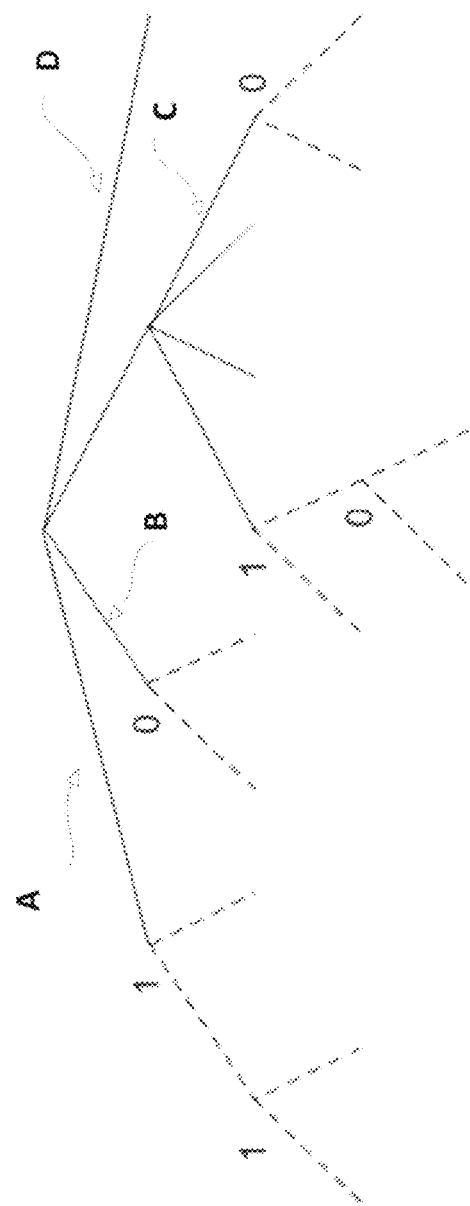
FIG. 8B shows a block partitioning tree in accordance with an embodiment.

According to some embodiments, the QTBT structure does not include multiple partition types (e.g., QTBT does not include the separation of the CU, PU and TU), and supports more flexibility for CU partition shapes. For example, in the QTBT block structure, a CU may have either a square or rectangular shape. FIG. 8A illustrates an example CTU (800) that is partitioned by the QTBT structure. For example, the CTU (800) is partitioned into four equal sized sub-CUs (A), (B), (C), and (D). FIG. 8B illustrates a corresponding coding tree that illustrates branches corresponding to sub-CUs (A), (B), (C), and (D). The solid lines indicate quad tree splitting, and the dotted lines indicate binary tree splitting. The binary tree structure may include two splitting types: (i) symmetric horizontal splitting and (ii) symmetric vertical splitting. In each splitting (i.e., non-leaf) node of the binary tree, one flag may be signalled to indicate which splitting type (e.g., horizontal or vertical) is used, where 0 indicates horizontal splitting and 1 indicates vertical splitting or vice versa. For the quad tree splitting, the splitting type is not indicated since quad tree splitting splits a block both horizontally and vertically to produce 4 sub-blocks with an equal size.

As illustrated in FIGS. 8A and 8B, the sub-CU (A) is first partitioned into two sub-blocks by a vertical split, where the left sub-block is partitioned again by another vertical split. The sub-CU (B) is further partitioned by a horizontal split. The sub-CU (C) is further partitioned by another quad split partition. The upper left sub-block of sub-CU (C) is partitioned by a vertical split, and subsequently partitioned by a horizontal split. Furthermore, the lower right sub-block of sub-CU (C) is partitioned by a horizontal split. The upper right and lower left sub-blocks of sub-CU (C) are not further partitioned. The sub-CU (D) is not partitioned further and thus, does not include any additional leaf nodes in the coding tree below the "D" branch.

The binary tree leaf nodes may be referred to as CUs, where the binary splitting may be used for prediction and transform processing without any further partitioning, which means that the CU, PU, and TU have the same block size in the QTBT coding block structure. A CU may include coding blocks (CBs) of different color components. For example, one CU may contain one luma CB and two chroma CBs in the case of P and B slices of a 4:2:0 chroma format, and sometimes contain a CB of a single component (e.g., one CU contains only one luma CB or just two chroma CBs in the case of Intra-pictures or I slices). In some embodiments, in intra-pictures or I-slices, the TU width or height is constrained to not exceed a given limit (e.g., 64 for luma and 32 for chroma). If the CB width or height is larger than the limit, then the TU is further split until the TU's size does not exceed the limit.

According to some embodiments, the QTBT partitioning scheme includes the following parameters:

CTU size: the root node size of a quad tree

MinQTSize: the minimum allowed quad tree leaf node size

MaxBTSize: the maximum allowed binary tree root node size

MaxBTDepth: the maximum allowed binary tree depth

MinBTSize: the minimum allowed binary tree leaf node size

In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The QTBT partitioning structure is applied to the CTU first to generate quad tree leaf nodes. The quad tree leaf nodes may have a size from 16×16 (i.e., the MinQTSize) to 128×128 (i.e., the CTU size). If the leaf quad tree node is 128×128, the leaf quad tree node will not be further split by the binary tree since the size exceeds the MaxBTSize (i.e., 64×64). Otherwise, the leaf quad tree node may be further partitioned by the binary tree. Therefore, the quad tree leaf node is also the root node for the binary tree and the quad tree leaf has the binary tree depth as 0. When the binary tree depth reaches the MaxBTDepth (e.g., 4), no further splitting is performed. When the binary tree node has width equal to the MinBTSize (e.g., 4), no further horizontal splitting is performed. Similarly, when the binary tree node has a height equal to MinBTSize, no further vertical splitting is performed. The leaf nodes of the binary tree are further processed by prediction and transform processing without any further partitioning. In some embodiments, the maximum CTU size is 256×256 luma samples.

The QTBT partition structure may further support the ability for the luma and chroma components to each have separate QTBT structures. For example, for P and B slices, the luma and chroma CTBs in one CTU may share the same QTBT structure. However, for I slices, the luma CTB is partitioned into CUs by a QTBT structure, and the chroma CTBs are partitioned into chroma CUs by another QTBT structure. Therefore, in this example, a CU in an I slice contains a coding block of the luma component or coding blocks of two chroma components, and a CU in a P or B slice contains coding blocks of all three color components.

In some embodiments, inter prediction for small blocks is restricted to reduce the memory access requirements of motion compensation, such that bi-prediction is not supported for 4×8 and 8×4 blocks, and inter prediction is not supported for 4×4 blocks. In other embodiments, the QTBT partition scheme does not include these restrictions.

Figure 9A:
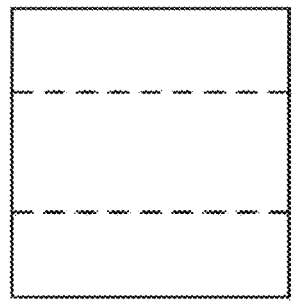
FIG. 9A shows a vertical center-side ternary tree partitioning in accordance with an embodiment.
Figure 9B:
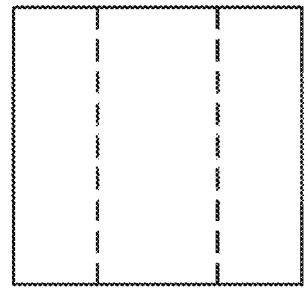
FIG. 9B shows a horizontal center-side ternary tree partitioning in accordance with an embodiment.

According to some embodiments, a Multi-type-tree (MTT) structure includes (i) quad tree splitting, (ii) binary tree splitting, and (iii) horizontal and vertical center-side ternary trees. FIG. 9A illustrates an embodiment of a vertical center-side ternary tree and FIG. 9B illustrates an example of a horizontal center-side ternary tree. Compared to the QTBT structure, MTT can be a more flexible tree structure since additional structures are permitted.

Ternary tree partitioning includes significantly advantageous features such as providing a complement to quad tree and binary tree partitioning where ternary tree partitioning is able to capture objects which are located in a block center, whereas quad tree and binary tree split along the block center. As another advantage of ternary tree partitioning, the width and height of the partitions of the proposed ternary trees are a power of 2 so that no additional transforms are needed. A two-level tree provides the advantage of complexity reduction. As an example, the complexity of traversing a tree is $T^D$, where T denotes the number of split types, and D is the depth of tree.

III. YUV Formats

There are different YUV formats or chroma formats (chroma sampling formats), which are shown in FIGS. 10A-10D. Each chroma format may define a different sampling or down-sampling grid of different color components.

IV. Color Formats

The color of video samples may be represented in different color formats or color spaces (e.g., YCbCr or RGB). In the RGB format, the three components (i.e., R, G, and B) have strong correlations, which results in statistical redundancy among the three color components. A color representation of video samples may be converted into a different color space using linear transforms. Such an operation or process can be referred to as a color space conversion.

Converting a RGB color space to a YUV color space may be performed as follows:

$$Y=((66*R+129*G+25*B+128)>>8)+16 \quad \text{Eq. (1):}$$

$$U=((-38*R-74*G+112*B+128)>>8)+128 \quad \text{Eq. (2):}$$

$$V=((112*R-94*G-18*B+128)>>8)+128 \quad \text{Eq. (3):}$$

In an alternative form, converting a RGB color space to a YUV color space may be performed as follows:

$$Y=\text{round}(0.256788*R+0.504129*G+0.097906*B)+16 \quad \text{Eq. (4):}$$

$$U=\text{round}(-0.148223*R-0.290993*G+0.439216*B)+128 \quad \text{Eq. (5):}$$

$$V=\text{round}(0.439216*R-0.367788*G-0.071427*B)+128 \quad \text{Eq. (6):}$$

V. Adaptive Color Transform

The embodiments disclosed herein may be used separately or combined in any order. Further, each of the methods, encoder, and decoder according to the embodiments of the present disclosure may be implemented by processing circuitry (e.g., one or more processors or one or more integrated circuits). In one example, the one or more processors execute a program that is stored in a non-transitory computer-readable medium. According to embodiments of the present disclosure, the term block may be interpreted as a prediction block, a coding block, or a coding unit (i.e., CU).

According to embodiments of the present disclosure, the term luma component may refer to any color component that is coded as the first component in coding order (e.g., (R)ed or (G)reen color component). Furthermore, according to embodiments of the present disclosure, the term chroma component may refer to any color component that is not coded as the first component in coding order. For example, the second or third component can be referred to as a chroma component.

In some embodiments, for efficient coding of RGB video content, an in-loop color transform (also referred to as color space conversion) can be employed to handle different characteristics of image blocks. As the color transform can be used adaptively for different CUs, the color transform as a coding tool can be referred to as adaptive color transform (ACT). The ACT can operate in the residue domain in some examples. A CU-level flag may be signaled to indicate the usage of ACT.

For example, much screen content is captured in the RGB color space. For an image block in the RGB color space, usually, there can be strong correlation among different color components such that a color space conversion is useful for removing inter-color component redundancy. However, for screen content, there may exist many image blocks containing different features having very saturated colors, which leads to less correlation among color components. For those blocks, coding directly in the RGB color space may be more effective. Accordingly, color space conversion can be adaptively applied to image blocks with different characteristics.

In an example, the forward ACT color transform (e.g., transform performed at encoder) may be performed as follows to convert an image block in the RGB color space to a YCoCg color space:

$$\begin{bmatrix} Y \\ C_g \\ C_o \end{bmatrix} = \frac{1}{4} \begin{bmatrix} 1 & 2 & 1 \\ -1 & 2 & -1 \\ 2 & 0 & -2 \end{bmatrix} \times \begin{bmatrix} R \\ G \\ B \end{bmatrix} \quad \text{Eq. (7)}$$

The backward ACT color transform (e.g., inverse transform performed at decoder) may be performed as follows:

$$\begin{bmatrix} R \\ G \\ B \end{bmatrix} = \begin{bmatrix} 1 & -1 & 1 \\ 1 & 1 & 0 \\ 1 & -1 & -1 \end{bmatrix} \times \begin{bmatrix} Y \\ C_g \\ C_o \end{bmatrix} \quad \text{Eq. (8)}$$

Figure 11:
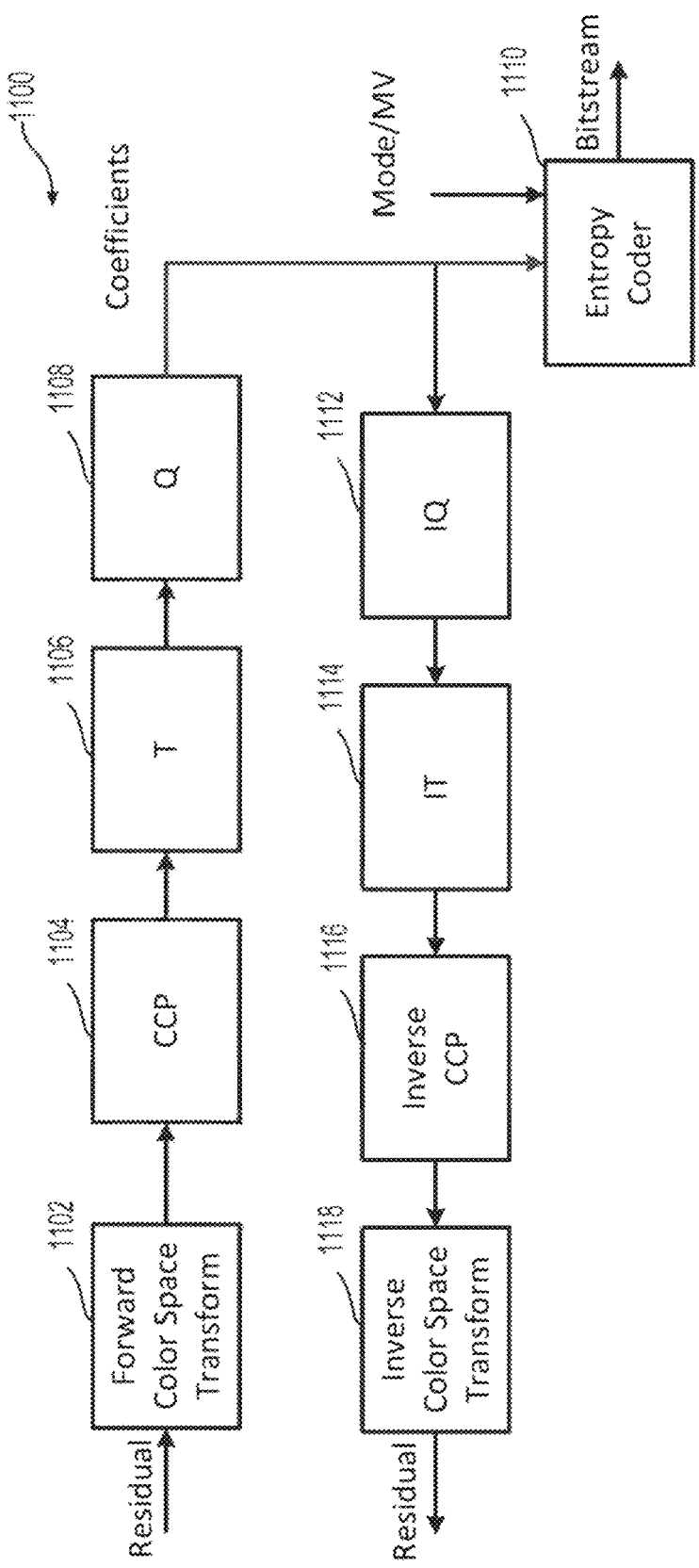
FIG. 11 illustrates an example encoder in accordance with an embodiment.

FIG. 11 illustrates an example encoder (1100) for performing a color space transform. In FIG. 11, prediction is performed prior to the color space transform being applied. For example, inter prediction or intra prediction is performed on a current block to produce a residual signal. The residual signal is provided to a forward color space transform unit (1102) to perform a forward transform such as the transform in Eq. (7). The output of the forward color space transform is provided to a cross component prediction (CCP) unit (1102). The output of the (CCP) unit (1102) is provided to a transform (T) unit (1106) to perform a transform such as a type of discrete cosine transform (DCT) to generate transform coefficients. The output of the transform unit (1106) is provided to a quantizer (Q) (1108) to produce quantized coefficients. The quantized coefficients are provided to an entropy coder unit (1110) to convert bins of the quantized coefficients to bits in a bitstream. The entropy coder unit (1110) may receive intra prediction mode or motion vector (MV) information associated with the current block, and entropy encoding that information into the bitstream.

The encoder (1100) may also include the components to reconstruct a residual signal. For example, the quantized coefficients may be provided to an inverse quantizer (IQ) unit (1112). The output of the inverse quantizer unit (IQ) may be provided to an inverse transform (IT) unit (1114). The output of the inverse transform (IT) unit (1114) may be provided to an inverse CCP unit (1116). The output of the inverse CCP unit (1116) may be provided to an inverse color space transform unit (1118) where an inverse color transform such as the transform illustrated in Eq. (8) may be performed to generate the reconstructed residual signal.

Figure 12:
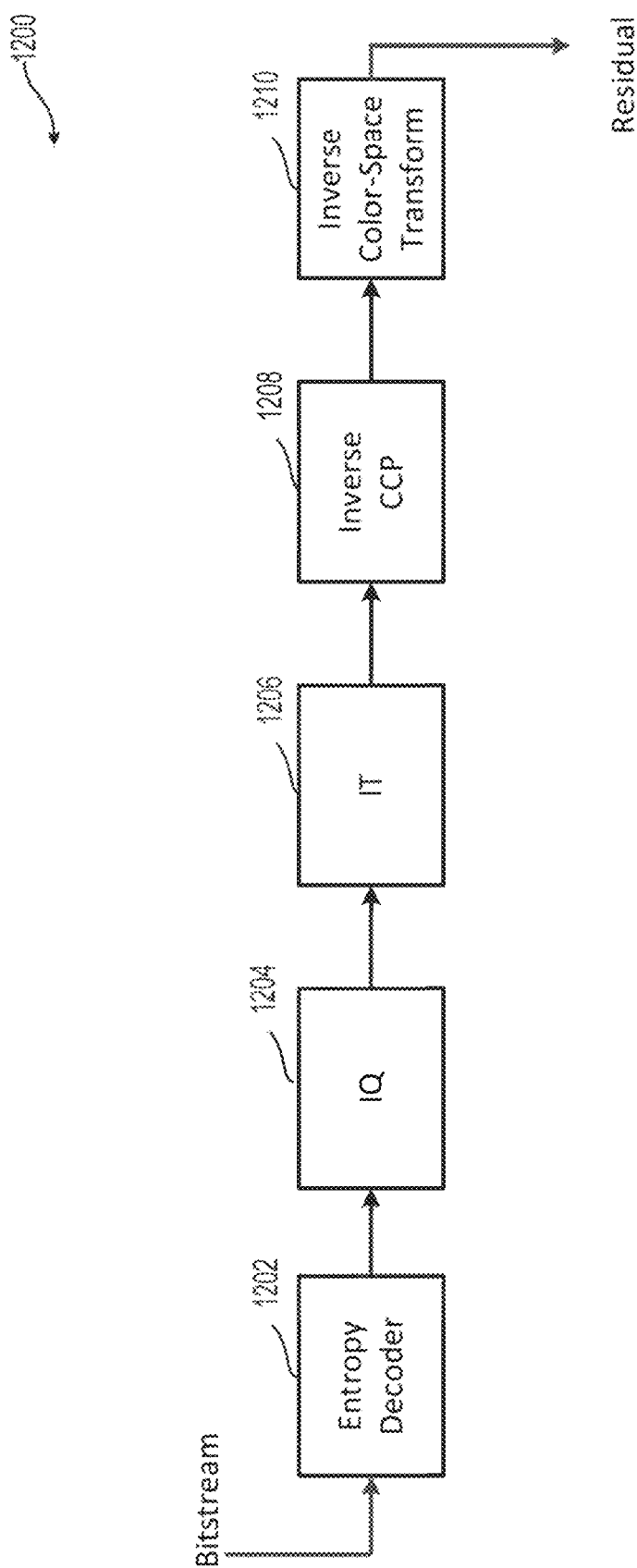
FIG. 12 illustrates an example decoder in accordance with an embodiment.

FIG. 12 illustrates an example decoder (1200) for converting a bitstream to a residual signal. The bitstream illustrated in FIG. 12 may be the bitstream produced by entropy coder (1110) in the FIG. 11 example. The bitstream may be provided to an entropy decoder unit (1202). The output of an entropy decoder unit (1202) may be provided to an inverse quantizer (IQ) unit (1204). The output of the inverse quantizer unit (IQ) (1204) may be provided to an inverse transform (IT) unit (1206). The output of the inverse transform (IT) unit (1206) may be provided to an inverse CCP unit (1208). The output of the inverse CCP unit (1208) may be provided to an inverse color space transform unit (1210) where an inverse color transform such as the transform illustrated in Eq. (8) may be performed to produce the residual signal. Intra prediction or inter prediction may be performed to generate a prediction block which is combined with the residual signal to reconstruct a current block. The units disclosed in FIGS. 11 and 12 may be implemented in software executed by a processor or by circuitry such as a specialized integrated circuit designed to perform the function of each unit.

In the examples of FIGS. 11 and 12, the CCP operation can be optionally performed in spatial residual domain. For example, the residual of the second or third color component (also referred to as chroma components) can be predicted from the residual of the first color component (also referred to as luma components) in CCP. When the ACT is not used, the CCP can significantly improve coding efficiency when coding videos have the RGB color format. When the ACT is used, the CCP can still be used in combination with the ACT to improve the coding efficiency for videos in the RGB color space.

In the Examples of FIGS. 11 and 12, the transform operation can be optionally performed, for example, depending on characteristics of CUs. For example, for certain type of screen content, avoiding usage of the transform operation may have a better coding performance than using the transform. For example, a CU level transform skip flag can be signaled for indicating whether a transform is skipped for the CU. Similarly, the quantization operation may also be optional. For example, when lossless mode is configured for certain types of video content (medical images, wireless local screen sharing), the transform and the quantization can be skipped for certain CUs. For example, a CU level CU transform and quantization skip flag can be signaled for indicating a lossless mode being applied.

In some embodiments, unless a maximum transform size is smaller than the width or height of one coding unit (CU), one CU leaf node is also used as the unit of transform processing. In an example, an ACT flag is signaled for one CU to select the color space for coding its residuals. In addition, in an example, for inter and intra block copy (IBC) CUs, the ACT is enabled when there is at least one non-zero coefficient in the CU. For intra CUs, the ACT is enabled when chroma components select the same intra prediction mode of luma component, i.e., DM mode. In an embodiment, to compensate a dynamic range change of residuals signals before and after color transform, QP adjustments, for example, of (−5, −5, −3), are applied to the transform residuals.

As the forward and inverse color transforms need to access the residuals of all three components, in some embodiments, the ACT is disabled for some scenarios where not all residuals of three components are available. For example, when separate-tree partition is employed, luma and chroma samples inside one CTU are partitioned by different tree structures. This results in that the CUs in the luma-tree only contains luma component and the CUs in the chroma-tree only contains two chroma components. When intra sub-partition prediction (ISP) is employed, the ISP sub-partition is applied to luma while chroma signals are coded without splitting. Except the last ISP sub-partitions, the other sub-partitions only contain luma component. Accordingly, the ACT can be disabled for separate-tree (dual tree) partition and ISP.

VI. Cross-Component Linear Model (CCLM)

For the chroma component of an intra PU, the encoder may select the best chroma prediction modes among 8 modes including Planar, DC, Horizontal, Vertical, a direct copy of the intra prediction mode (DM) from the luma component, Left and Top Cross-component Linear Mode (LT_CCLM), Left Cross-component Linear Mode (L_CCLM), and Top Cross-component Linear Mode (T_CCLM). LT_CCLM, L_CCLM, and T_CCLM can be categorized into the group of Cross-component Linear Mode (CCLM). The difference between these 3 modes is that different regions of neighboring samples may be used for deriving the parameters $\alpha$ and $\beta$. For LT_CCLM, both the left and top neighboring samples may be used to derive the parameters $\alpha$ and $\beta$. For L_CCLM, in some examples, only the left neighboring samples are used to derive the parameters $\alpha$ and $\beta$. For T_CCLM, in some examples, only the top neighboring samples are used to derive the parameters $\alpha$ and $\beta$.

Cross-Component Linear Model (CCLM) prediction modes may be used to reduce a cross-component redundancy, in which the chroma samples are predicted based on the reconstructed luma samples of the same CU by using an example linear model as follows:

$$\text{pred}_C(i,j) = \alpha \cdot \text{rec}_L'(i,j) + \beta, \qquad \text{Eq. (9):}$$

where $\text{pred}_C(i,j)$ represents the predicted chroma samples in a CU and $\text{rec}_L(i,j)$ represents the downsampled reconstructed luma samples of the same CU. Parameters $\alpha$ and $\beta$ may be derived by a straight line equation, which may also be referred to as a max-min method. Since this computation process may be performed as part of the decoding process, not just as an encoder search operation, no syntax may be used to convey the $\alpha$ and $\beta$ values.

Figure 10B:
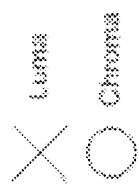
FIGS. 10A-10D illustrate different chroma formats in accordance with various embodiments.
Figure 10B:
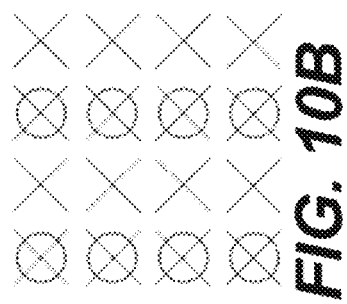
Figure 10D:
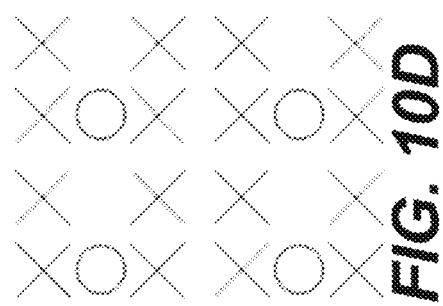
Figure 10A:
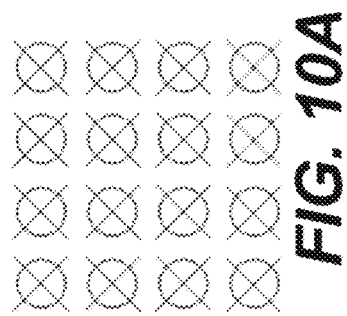
Figure 10C:
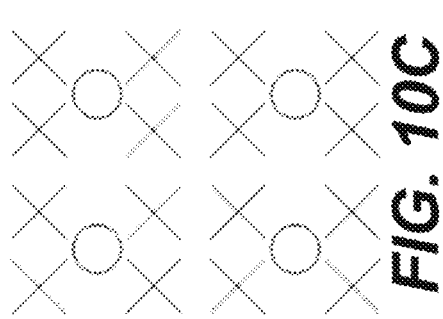

For chroma 4:2:0 format, CCLM prediction may apply a six-tap interpolation filter to get the down-sampled luma sample corresponding to a chroma sample as shown in FIGS. 10B-10D. In a formula way, a down-sampled luma sample Rec'L[x, y] is calculated from reconstructed luma samples as follows. The down-sampled luma samples may be used to find the maximum and minimum sample points. The 2 points (a pair of Luma and Chroma) (A, B) may be the minimum and maximum values inside the set of neighboring Luma samples as depicted in FIG. 13.

Figure 13:
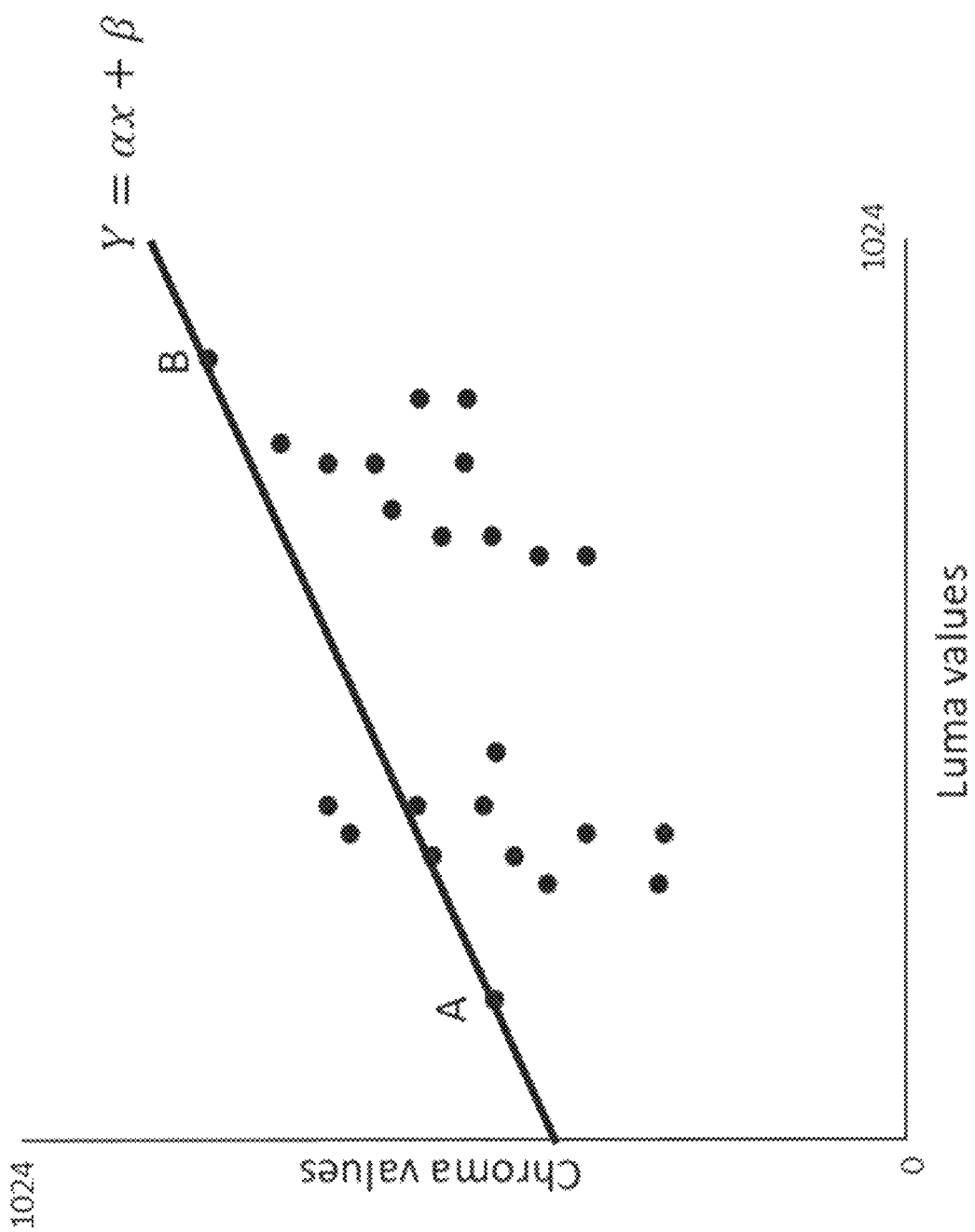
FIG. 13 illustrates a straight line between a minimum and maximum luma value in accordance with an embodiment.

In FIG. 13, the linear model parameters $\alpha$ and $\beta$ may be obtained according to the following equations:

$$\alpha = \frac{y_B - y_A}{x_B - x_A} \qquad \text{Eq. (10)}$$

$$\beta = y_A - \alpha x_A \qquad \text{Eq. (11)}$$

A division operation is advantageously avoided by using a multiplication and a shift operation in an example. One Look-up Table (LUT) may be used to store the pre-calculated values, and the absolute difference values between maximum and minimum luma samples may be used to specify the entry index of the LUT. The size of the LUT may be 512 in an example.

Figures 15A, 15B:
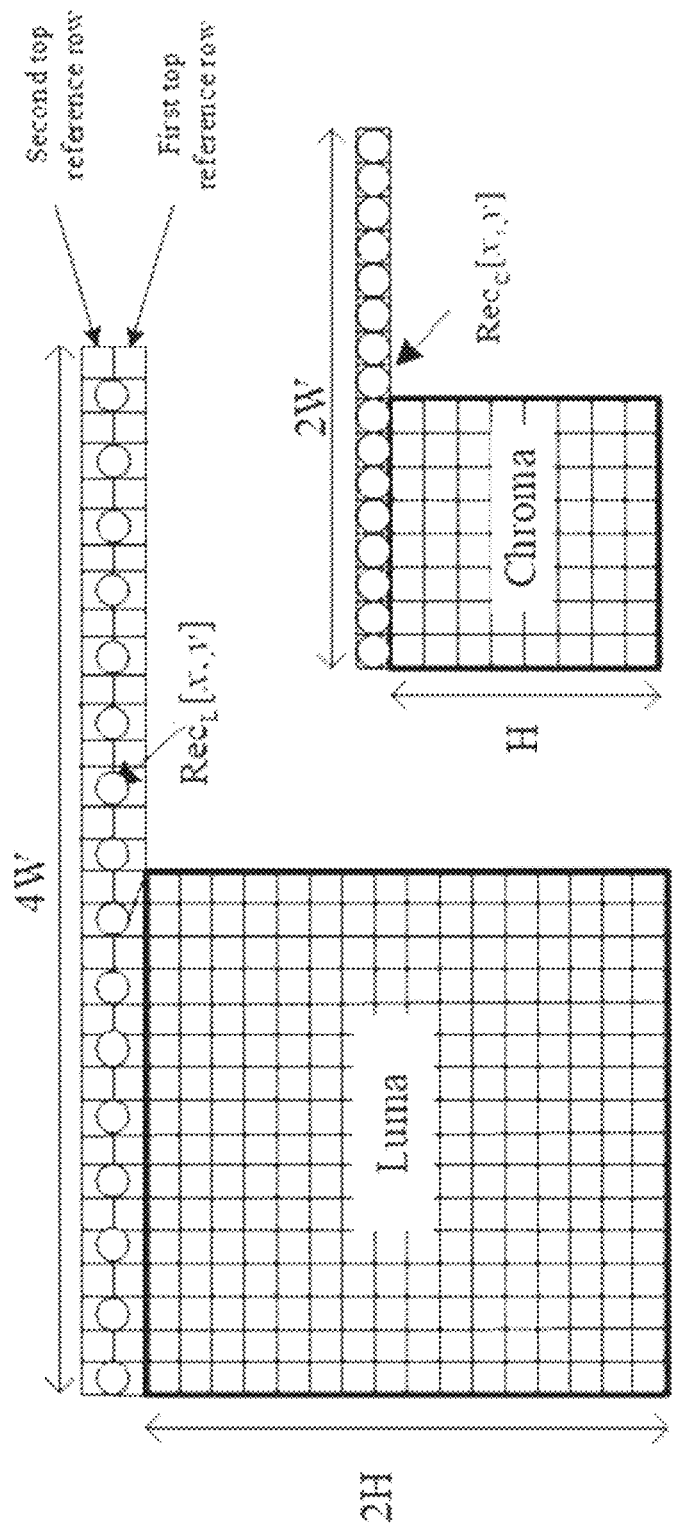
FIGS. 15A and 15B illustrate locations of the samples used for the derivation of $\alpha$ and $\beta$ in T_CCLM in accordance with an embodiment.

FIGS. 14A and 14B illustrate example locations of the samples used for the derivation of $\alpha$ and $\beta$ in LT_CCLM. In T_CCLM mode, in some examples, only the above neighboring samples (including 2*W samples) are used to calculate the linear model coefficients. FIGS. 15A and 15B illustrate example locations of the samples used for the derivation of $\alpha$ and $\beta$ in T_CCLM.

Figure 16B:
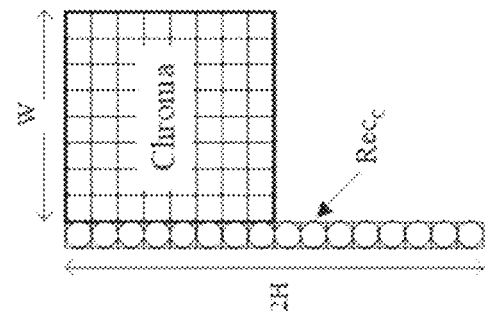
FIGS. 16A and 16B illustrate locations of the samples used for the derivation of $\alpha$ and $\beta$ in L_CCLM in accordance with an embodiment.
Figure 16A:
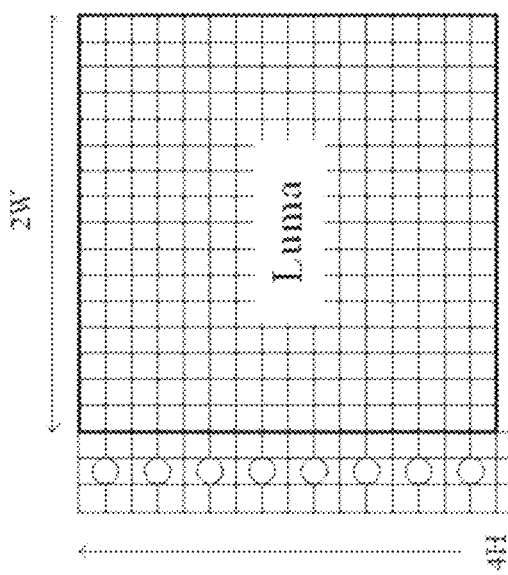

In L_CCLM mode, in some examples, only left neighboring samples (including 2*H samples) are used to calculate the linear model coefficients. FIGS. 16A and 16B illustrate example locations of the samples used for the derivation of $\alpha$ and $\beta$ in L_CCLM.

The CCLM prediction mode may also include prediction between the two chroma components (i.e., the Cr component is predicted from the Cb component). Instead of using the reconstructed sample signal, the CCLM Cb-to-Cr prediction may be applied in the residual domain. The CCLM Cb-to-Cr prediction may be implemented by adding a weighted reconstructed Cb residual to the original Cr intra prediction to form the final Cr prediction:

$$\text{pred}^*_{Cr}(i,j) = \text{pred}_{Cr}(i,j) + \alpha \cdot \text{resi}_{Cb}'(i,j) \quad \text{Eq. (12):}$$

The CCLM luma-to-chroma prediction mode may be added as one additional chroma intra prediction mode. At the encoder side, one more rate distortion (RD) cost checks for the chroma components are added for selecting the chroma intra prediction mode. When intra prediction modes other than the CCLM luma-to-chroma prediction mode is used for the chroma components of a CU, CCLM Cb-to-Cr prediction is used for Cr component prediction.

Multiple Model CCLM (MMLM) is another extension of CCLM, where there can be more than one model (e.g., two or more models). In MMLM, neighboring luma samples and neighboring chroma samples of the current block may be classified into two groups, where each group may be used as a training set to derive a linear model (i.e., a particular $\alpha$ and $\beta$ are derived for a particular group). Furthermore, the samples of the current luma block may also be classified based on the same rule for the classification of neighboring luma samples.

Figure 17:
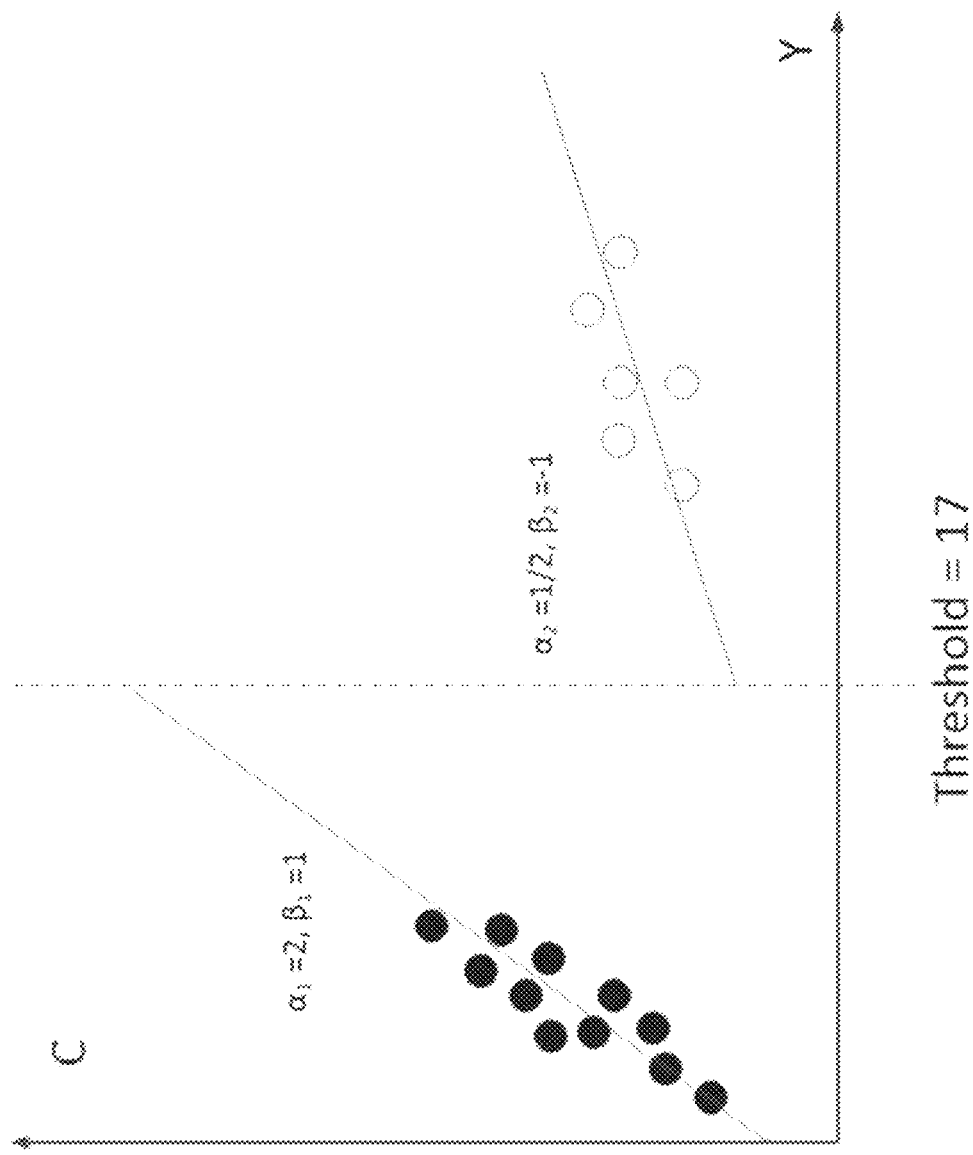
FIG. 17 illustrates an example of classifying neighboring samples into two groups in accordance with an embodiment.

FIG. 17 shows an example of classifying the neighbouring samples into two groups. The threshold illustrated in FIG. 17 may be calculated as the average value of the neighbouring reconstructed luma samples. A neighbouring sample with Rec'L[x,y]<=Threshold is classified into group 1; while a neighbouring sample with Rec'L[x,y]>Threshold is classified into group 2.

$$\begin{cases} \text{Pred}_C[x, y] = \alpha_1 \times \text{Rec}'_L[x, y] + \beta_1 \text{ if } \text{Rec}'_L[x, y] \leq \text{Threshold} \\ \text{Pred}_C[x, y] = \alpha_2 \times \text{Rec}'_L[x, y] + \beta_2 \text{ if } \text{Rec}'_L[x, y] > \text{Threshold} \end{cases} \quad \text{Eq. (13)}$$

VII. Examples of ACT Applied for Prediction Process

According to some embodiments, a color transform (such as ACT) can be applied before a prediction process is performed at the encoder, and after the reconstruction process is performed at the decoder. At the encoder, the ACT may be performed before prediction (e.g., inter prediction, intra prediction), and the reference samples and input original samples may both be mapped to a different color space if ACT is applied for a current CU. For pixel reconstruction at the decoder, if ACT is applied to a block under reconstruction, the reference samples may be mapped to the alternative color space before being used for prediction, and reconstructed samples may then be mapped back to the original color space.

Figure 18:
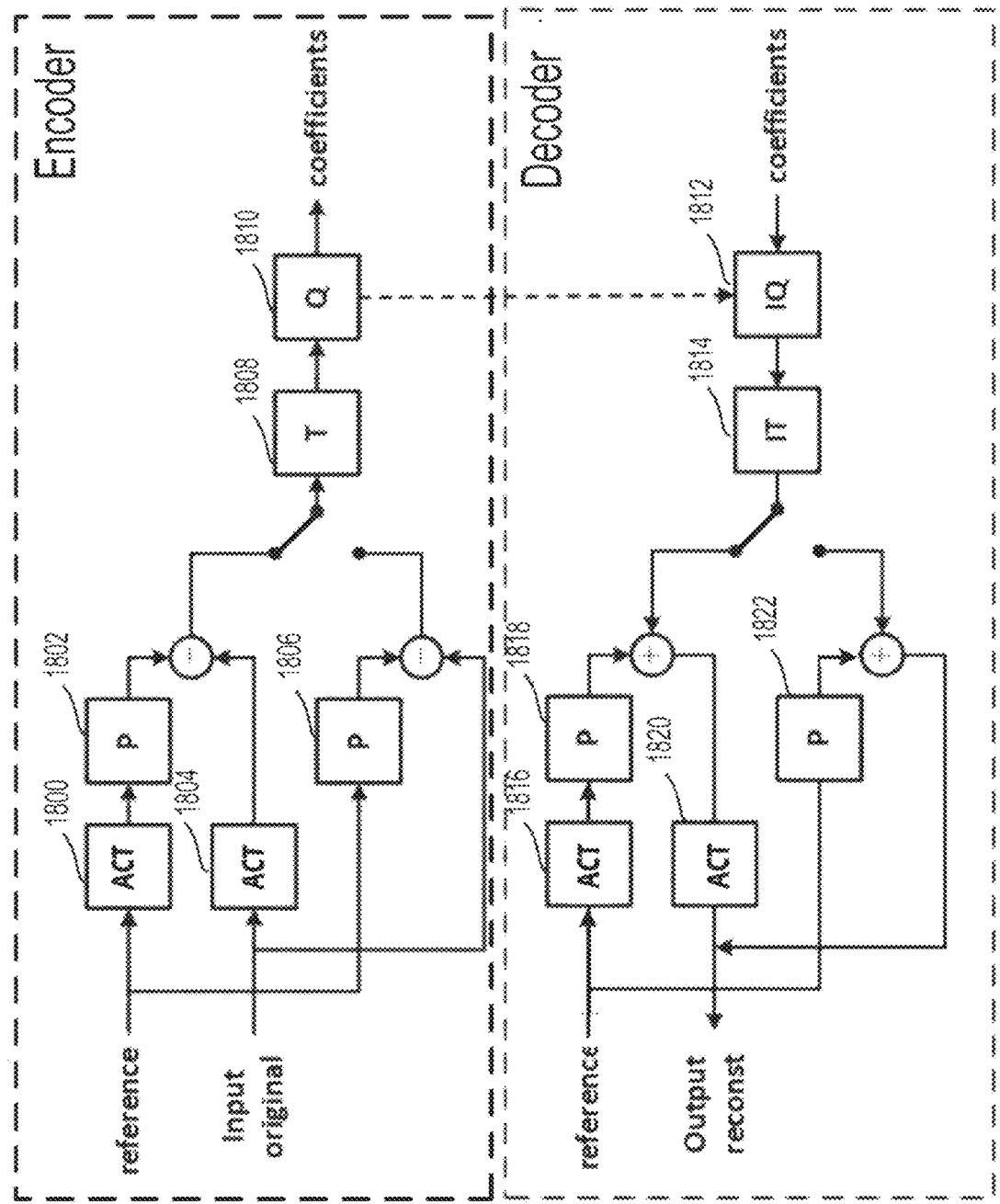
FIG. 18 is a schematic illustration of an encoder and a decoder in accordance with an embodiment.

FIG. 18 illustrates an embodiment of the encoder and decoder processes using ACT. The units disclosed in FIG. 18 may be implemented in software executed by a processor or by circuitry such as a specialized integrated circuit designed to perform the function of each unit disclosed in FIG. 18. At the encoder, ACT units (1800) and (1804) perform an ACT transform on both a reference signal and an input signal, respectively. The ACT transform performed at the encoder by ACT units (1800) and (1804) may be the ACT transform disclosed in Eq. (7). The output of ACT (1800) is provided to a prediction (P) unit (1802). Furthermore, the reference signal is provided to a prediction (P) unit (1806). The prediction (P) units (1802) and (1806) may perform inter prediction or intra prediction. A transform (T) unit 1808 receives one of (i) a difference between the output of the prediction (P) unit (1802) and the output of the ACT unit (1804) and (ii) a difference between an output of the prediction (P) unit (1806) and the input signal. The transform (T) unit (1808) may perform a transform operation such as a discrete cosine transform (DCT). The output of the transform (T) unit 1808 is provided to a quantizer unit (Q) (1810) to perform a quantization operation to produce a set of coefficients.

At the decoder, an inverse quantizer (IQ) unit (1812) receives coefficients to perform an inverse quantization process. The output of the inverse quantizer (IQ) unit (1812) is provided to an inverse transform (IT) unit (1814) to perform an inverse transform. An ACT unit (1820) receives a sum of an output of a prediction (P) unit (1818) and the output of the inverse transform (IT) (1814) unit. An ACT unit (1816) receives a reference signal and perform an ACT to generate an input to the prediction (P) unit (1818). The ACT unit (1816) may perform a color transform such as the color transform disclosed in Eq. (7). The ACT unit (1820) may perform an inverse color transform such as the inverse color transform disclosed in Eq. (8). The prediction (P) units (1818) and (1822) may perform inter prediction or intra prediction. The reconstructed original signal is provided by the output of the ACT unit (1820), or by combination of the outputs of the prediction unit (1822) and the inverse transform (IT) unit (1814).

VIII. Modified Color Transform Equations

According to some embodiments, in an ACT process, the 2nd and 3rd color components (chroma components) can further be offset by a constant c after and before the color transform for forward and backward transform, respectively. Eq. (14) illustrates the modified forward transform, and Eq. (15) illustrates the modified backward (i.e., inverse) transform.

$$\begin{bmatrix} Y \\ C_g \\ C_o \end{bmatrix} = \frac{1}{4} \begin{bmatrix} 1 & 2 & 2 \\ -1 & 2 & -1 \\ 2 & 0 & -2 \end{bmatrix} \times \begin{bmatrix} R \\ G \\ B \end{bmatrix} + \begin{bmatrix} 0 \\ c \\ c \end{bmatrix} \quad \text{Eq. (15)}$$

$$\begin{bmatrix} R \\ G \\ B \end{bmatrix} = \begin{bmatrix} 1 & -1 & 1 \\ 1 & 1 & 0 \\ 1 & -1 & -1 \end{bmatrix} \times \begin{bmatrix} Y \\ C_g - c \\ C_o - c \end{bmatrix} \quad \text{Eq. (16)}$$

In some embodiments, the constant c is derived as 1<<(bitDepth−1), where bitDepth refers to a bit-depth of an input sample.

IX. Examples of Interactions Between ACT and Other Coding Tools

In some embodiments, to enable in-loop color transform for efficient coding of input video with RGB format, interactions between color transform (in residual domain or before prediction) and several coding tools needs to be handled. Examples of such coding tools include cross-component linear model (CCLM) and dual tree partitioning. Embodiments of the present disclosure provide the advantageous features of handling color transform with consideration of certain coding tools.

In some embodiments, a color transform is only applied when different color components are coded using a same transform unit partitioning tree. In one embodiment, when dual tree is applied on an intra slice, the color transform is applied for an inter slice only.

In some embodiments, when a color transform (e.g., in spatial residual domain) is applied, the CCLM mode is not applied or signaled since the generation of residual samples from one component depends on the reconstruction of another component. In another embodiment, when the CCLM mode is used, the color transform (e.g., in residual domain) is not applied or signaled. In one embodiment, when the color transform is applied on intra residual samples, the CCLM mode is not applied or signaled since the generation of residual samples from one component depends on the reconstruction of another component. In one embodiment, when the color transform is applied on a residual sample and CCLM mode is used, the color transform (e.g., before prediction) is not applied or signaled.

In some embodiments, a color transform is signaled for each CTU which is the largest coding unit (CU). In some embodiments, a color transform is signaled and applied only for intra coded blocks, or only for inter coded blocks. In some embodiments, when a color transform is applied, the dual tree is not applied (i.e., different color components share the same transform unit partitioning).

In some embodiments, for a current CU, when a bit depth of samples of a luma sample array, denoted by BitDepthY, is different from a bit depth of samples of a chroma sample array, denoted by BitDepth C, color transform (e.g., in spatial residual domain, or before prediction) is not used on the CU. For example, the current CU can be partitioned from a picture having a 4:4:4 chroma format (RGB color format), however, the luma component and the chroma component are represented with different bit depths. For example, the luma component has a bit depth of 10 bits while the chroma component has a bit depth of 8 bits. The color transform by applying the various color transform equations (or color space conversion equations) disclosed herein may be ineffective for reducing statistic dependency among the luma and chroma components. In such a scenario, a decoder can determine that no color transform is used for a current CU when a syntax element(s) indicating different bit depths for different color components is received.

In an embodiment, when transform skip flags signaled in TU level (or CU level) for each color component index for a current CU are all equal to 1 or 0, a QP for each component of the current CU is equal to 4, and the bit depths of the luma and chroma components are different, color transform (in spatial residual domain or before prediction) is not used for the CU. In an example, the transform skip flags for the luma or the chroma component specifies whether a transform (e.g., DCT transform) is applied to an associated transform block or not. The transform skip flag equal to 1 specifies that no transform is applied to the associated transform block. The transform skip flag equal to 0 specifies that the decision whether transform is applied to the associated transform block or not depends on other syntax elements.

In an example, when the transform skip flag is not present, it is inferred as follows. If a block-based differential pulse code modulation (BDPCM) flag of the respective color component is equal to 1, the transform skip flag is inferred to be equal to 1. Otherwise (the BDPCM flag is equal to 0), the transform skip flag is inferred to be equal to 0. For example, the BDPCM flag equal to 1 specifies that BDPCM is applied to the current chroma or luma coding blocks i.e. the transform is skipped. The BDPCM equal to 0 specifies that BDPCM is not applied to the current chroma or luma coding blocks. In an example, when the BDPCM flag is not present, the BDPCM flag is inferred to be equal to 0.

In an example, when the QP for each component of the CU is equal to 4, a corresponding quantization step for quantizing transform coefficients can have a value of 1. As a result, there are no changes to values of the original transform coefficients after the quantization operation. Accordingly, the QP of a value of 4 has the effect of a lossless mode.

In an embodiment, when transform skip flags signaled in TU level (or CU level) for each color component index for a current or CU are all equal to 1 or 0 and a QP for each component of the current CU is equal to 4, color transform (in spatial residual domain or before prediction) is not used for the current CU.

In an embodiment, when transform skip flags signaled in TU level (or CU level) for each color component index for a current CU are all equal to 1 or 0, color transform (in spatial residual domain or before prediction) is not used for the current CU.

In some embodiments, two options of color space conversion are provided for encoding or decoding processing. An encoder can select one of the two options to perform a color transform, for example, based on a rate-distortion cost evaluation, and signal the selection in a bitstream. Or, an encoder can signal to a decoder (e.g., by transmitting a flag) that a color transform is applied for a CU. The decoder can determine which one of the two options is used for the CU based on a set of conditions. Information of those conditions can be received or derived from one or more syntax elements transmitted in a bitstream.

In some examples, inverse color space conversions of the two options of color transform can be defined as follows:

Option 1:

$$tmp = rY[x][y] - (rCb[x][y] >> 1) \qquad \text{Eq. (17):}$$

$$rY[x][y] = tmp + rCb[x][y] \qquad \text{Eq. (18):}$$

$$rCb[x][y] = tmp - (rCr[x][y] >> 1) \qquad \text{Eq. (19):}$$

$$rCr[x][y] = rCb[x][y] + rCr[x][y] \qquad \text{Eq. (20):}$$

Option 2:

$$tmp = rY[x][y] - rCb[x][y] \qquad \text{Eq. (21):}$$

$$rY[x][y] = rY[x][y] + rCb[x][y] \qquad \text{Eq. (22):}$$

$$rCb[x][y] = tmp - rCr[x][y] \qquad \text{Eq. (23):}$$

$$rCr[x][y] = tmp + rCr[x][y] \qquad \text{Eq. (24):}$$

where the inputs to each color transform option can be arrays of residual samples: an array of luma residual samples of a luma residual block, denoted by rY, an array of chroma residual samples of a first chroma residual block, denoted by rCb, and an array of chroma residual samples of a second chroma residual block, denoted by rCr. [x][y] represents a coordinate of the residual samples within the respective residual block. For example, x can be an integer in a range from 0 to a block width minus 1, and y can be an integer in a range from 0 to a block height minus 1.

For example, the two options of color transform, Option 1 and Option 2, can be used at the inverse color-space transform unit (1210) in the FIG. 12 example to convert luma and chroma residual blocks to a modified version of luma and chroma residual blocks.

According to the present disclosure, the color transform corresponding to the first option, Option 1, can be suitable for lossless processing of CUs, while the color transform corresponding to the second option, Option 2, can be suitable for lossy processing of CUs. For example, for CUs with a lossless mode enabled (e.g., transform and quantization skip flag equal to 1 is signaled or interpreted), Option 1 color transform can have a better decorrelation effect than Option 2 color transform.

In an embodiment, for a current CU, when color transform is applied and signaled on CU level, transform skip flags signaled in CU level (or TU level) for each component index are all equal to 1, and a QP of each component of the current CU is equal to 4, it can be determined than the Option 1 color transform can be applied for the CU. For example, a CU level color transform enabled flag can be received from a bitstream at a decoder. The color transform enabled flag equal to 1 specifies that the decoded residuals of the current coding unit are applied using a color space conversion. The color transform enabled flag equal to 0 specifies that the decoded residuals of the current coding unit are processed without a color space conversion. In an embodiment, when the color transform enabled flag is not present, the color transform enabled flag is inferred to be equal to 0. One or more syntax elements indicating the QP of value 4 can also be received from the bitstream. Based on values of the CU level color transform enabled flag, the transform skip flags, and the QP value, the decoder can determine that Option 1 color transform is applied to the current CU.

In an embodiment, for a current CU, when color transform is applied and signaled on CU level, and at least one of transform skip flags signaled in CU level (TU level) for each component index is not equal to 1, it can be determined that the Option 2 color transform is applied to the current CU. In an embodiment, for a current CU, when color transform is applied and signaled on CU level, and a QP of one of the components of the current CU is not equal to 4, it can be determined that the Option 2 color transform is applied to the current CU.

In an embodiment, for a current CU, when color transform is applied and signaled in CU level and transform skip flags signaled in CU level for each component index are all equal to 1, it can be determined that the Option 1 color transform is applied to the current CU.

In an embodiment, only Option 1 color transform is applied for a CTU, a slice, a video sequence, or the like. Option 2 color transform is not used. In an embodiment, only Option 1 color transform is applied for a CTU, a slice, a video sequence, or the like regardless of values of transform and quantization bypass flags. In an example, the transform and quantization bypass equal 1 specifies transform and quantization is bypassed for a current CU. The current CU thus can be processed in a lossless mode. The transform and quantization bypass equal 1 specifies transform and quantization is not bypassed for the current CU, or whether the transform and quantization is bypassed for the current CU depends on other information.

In an embodiment, the selection of color transform (whether Option 1 or Option 2) depends on a transform skip flag(s) and/or a BDPCM flag(s) of a current CU. In an example, the selection of the color transform option can depend on transform skip flags of each color component of the current CU as described above.

In an example, the selection of a color transform option can depend on a BDPCM flag of the current CU. For example, when the BDPCM flag indicates a BDPCM mode is applied to a luma or chroma component of the current CU, it can be determined that transform processing is skipped for the respective luma or chroma component. Otherwise, when the BDPCM flag indicates a BDPCM mode is not applied to a luma or chroma component of the current CU, it can be determined that transform is applied for the respective luma or chroma component. The transform skip flags can accordingly be interpreted to be zero or one. Accordingly, the selection of the color transform option, as described above, can depend on the transform skip flags of each color component with the interpreted values.

In an example, a BDPCM mode is used for processing a current CU. In a prediction process, for a current pixel X having pixel A as left neighbor, pixel B as top neighbor and C as top-left neighbor, a prediction P(X) can be determined by $$P(X) = \begin{cases} \min(A, B) \text{ if } C \geq \max(A, B) \\ \max(A, B) \text{ if } C \leq \min(A, B) \\ A + B - C \text{ otherwise} \end{cases}$$

The prediction process uses unfiltered reference pixels when predicting the top row and left column of the current CU. The prediction process then uses reconstructed pixels for the rest of the current CU. Pixels are processed in raster-scan order inside the CU. The prediction errors can then be quantized in spatial domain without transform followed by entropy coding. In an example, a BDPCM flag can be transmitted in CU level to indicate whether a regular intra coding or a BDPCM is used.

X. Examples of Decoding Process with Color Transform

Figure 19:
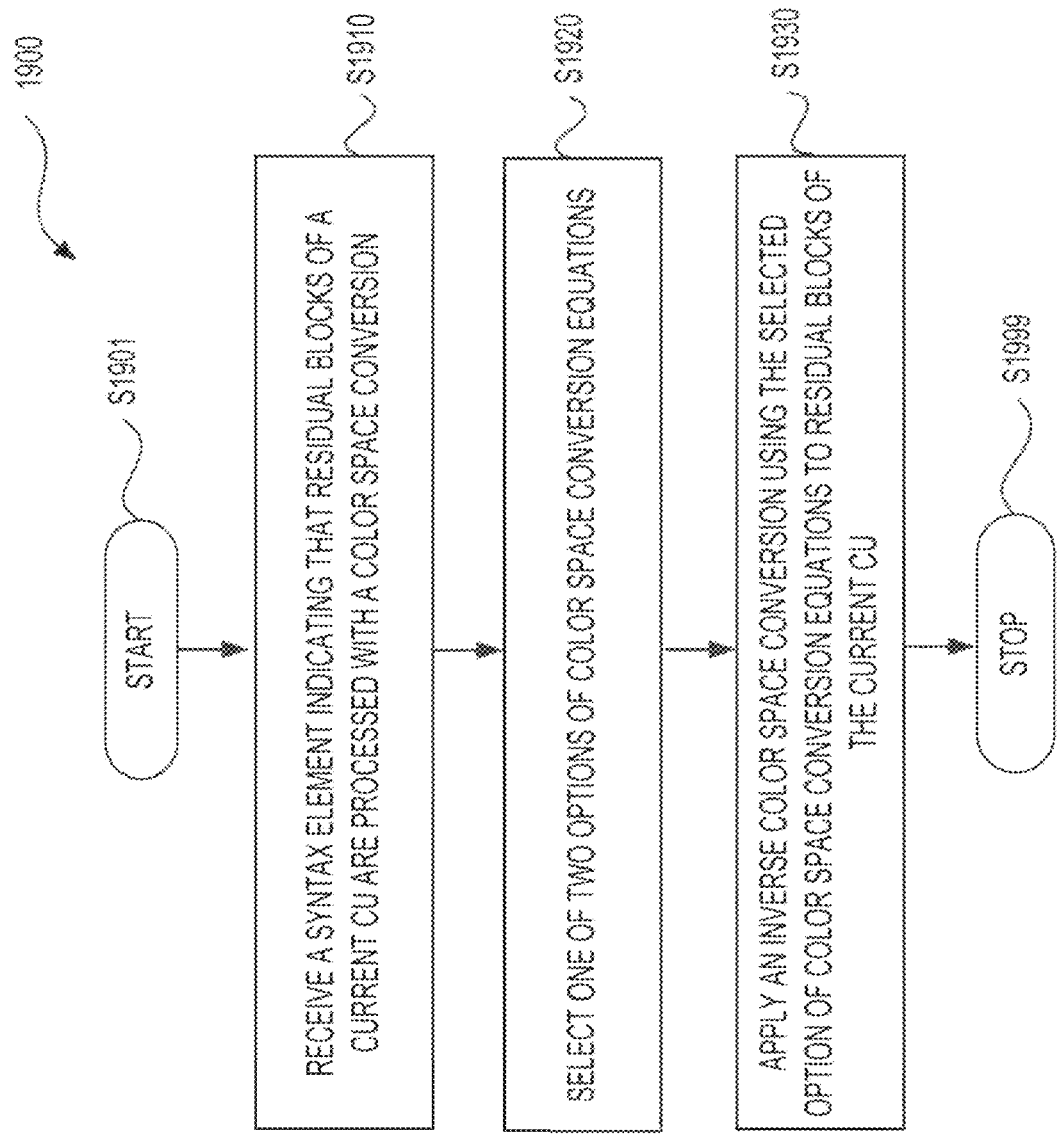
FIG. 19 is an illustration of an embodiment of a process performed by a decoder.

FIG. 19 illustrates an embodiment of a process (1900) performed by a decoder such as decoder (710). The process (1900) can start from (S1901), and proceed to (S1910).

At (S1910), a syntax element can be received from a bitstream of a coded video. For example, the syntax element can be a CU level color transform enabled flag indicating that residual blocks of a current CU are processed with a color space conversion. The residual blocks of the current CU can include a luma residual block, a first chroma residual block, and a second chroma residual block.

At (S1920), in response to receiving the syntax element indicating that the residual blocks of the current CU are processed with the color space conversion, one of two options of color space conversion equations can be selected. In an example, the two options of color space conversion equations can correspond to the Option 1 and Option 2 color space conversion represented by the equations (17)-(20) and equations (21)-(24). In other examples, the two options of color space conversion can take other forms corresponding to other color transform equations.

In an example, one of two options of color space conversion equations can be selected according to a value of a transform skip flag corresponding to each of the residual blocks of the current CU. The transform skip flags can be received from the bit stream of the coded video. Or, values of the transform skip flags can be interpreted based on other information if the transform skip flags are not signaled in the bit stream of the coded video.

In an example, one of two options of color space conversion equations can be selected according a QP of each of the residual blocks of the current CU. For example, when the QP has a value of 4, and the transform skip flags of each residual blocks are equal to 1, the Option 1 color transform can be selected. When the QP has a value not equal to 4, the Option 2 color transform can be selected.

In an example, the selection of one of the two options of color transform can depends on a BDPCM flag of the current CU. For example, when the BDPCM flag indicate a BDPCM mode is applied to a color component of the current CU, the transform skip flag of this color component of the current CU can be interpreted to have a value of 1. The selection of one of the two options can be based on the value of the transform skip flag in combination with values of transform skip flags of other color components of the current CU.

At (S1930), an inverse color space conversion using the selected option of color space conversion equations can be applied to the residual blocks of the current CU to generate modified versions of the residual blocks of the current CU. The process (1900) can proceed to (S1999) and terminate and (S1999).

XI. Computer System

The techniques described above, can be implemented as computer software using computer-readable instructions and physically stored in one or more computer-readable media. For example, FIG. 20 shows a computer system (2000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 20:
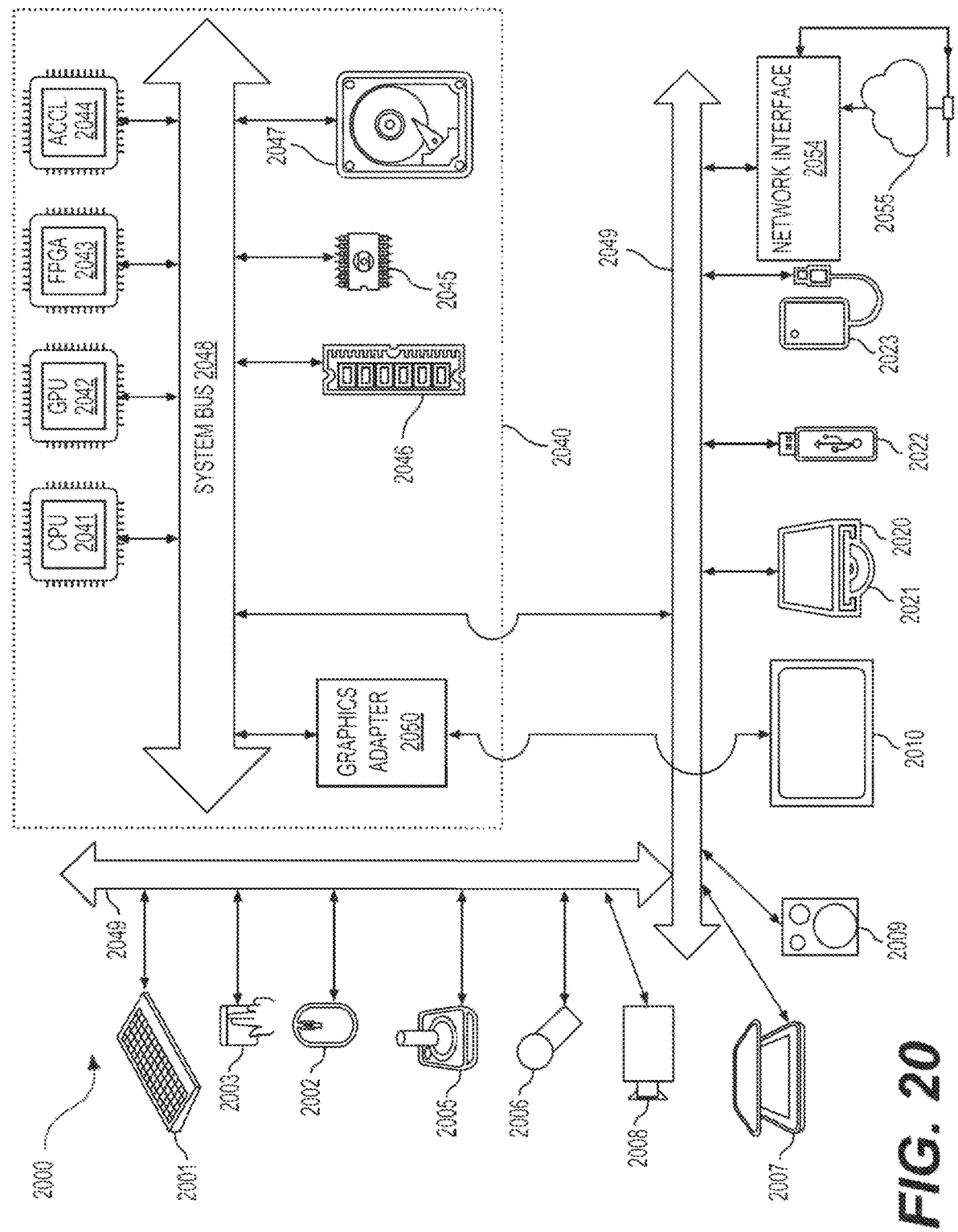
FIG. 20 is a schematic illustration of a computer system in accordance with an embodiment of the present disclosure.

The components shown in FIG. 20 for computer system (2000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2000).

Computer system (2000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2001), mouse (2002), trackpad (2003), touch screen (2010), data-glove (not shown), joystick (2005), microphone (2006), scanner (2007), camera (2008).

Computer system (2000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2010), data-glove (not shown), or joystick (2005), but there can also be tactile feedback devices that do not serve as input devices), audio output devices (such as: speakers (2009), headphones (not depicted)), visual output devices (such as screens (2010) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2000) can also include human accessible storage devices and their associated media such as optical media including CD/DVD ROM/RW (2020) with CD/DVD or the like media (2021), thumb-drive (2022), removable hard drive or solid state drive (2023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2000) can also include an interface (2054) to one or more communication networks (2055). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2049) (such as, for example USB ports of the computer system (2000)); others are commonly integrated into the core of the computer system (2000) by attachment to a system bus as described below (for example Ethernet interface into a PC computer system or cellular network interface into a smartphone computer system). Using any of these networks, computer system (2000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2040) of the computer system (2000).

The core (2040) can include one or more Central Processing Units (CPU) (2041), Graphics Processing Units (GPU) (2042), specialized programmable processing units in the form of Field Programmable Gate Areas (FPGA) (2043), hardware accelerators for certain tasks (2044), graphics adapters (2050), and so forth. These devices, along with Read-only memory (ROM) (2045), Random-access memory (2046), internal mass storage such as internal non-user accessible hard drives, SSDs, and the like (2047), may be connected through a system bus (2048). In some computer systems, the system bus (2048) can be accessible in the form of one or more physical plugs to enable extensions by additional CPUs, GPU, and the like. The peripheral devices can be attached either directly to the core's system bus (2048), or through a peripheral bus (2049). In an example, the screen (~~x10) can be connected to the graphics adapter (~~x50). Architectures for a peripheral bus include PCI, USB, and the like.

CPUs (2041), GPUs (2042), FPGAs (2043), and accelerators (2044) can execute certain instructions that, in combination, can make up the aforementioned computer code. That computer code can be stored in ROM (2045) or RAM (2046). Transitional data can also be stored in RAM (2046), whereas permanent data can be stored for example, in the internal mass storage (2047). Fast storage and retrieve to any of the memory devices can be enabled through the use of cache memory, that can be closely associated with one or more CPU (2041), GPU (2042), mass storage (2047), ROM (2045), RAM (2046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2000), and specifically the core (2040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2040) that are of non-transitory nature, such as core-internal mass storage (2047) or ROM (2045). The software implementing various embodiments of the present disclosure can be stored in such devices and executed by core (2040). A computer-readable medium can include one or more memory devices or chips, according to particular needs. The software can cause the core (2040) and specifically the processors therein (including CPU, GPU, FPGA, and the like) to execute particular processes or particular parts of particular processes described herein, including defining data structures stored in RAM (2046) and modifying such data structures according to the processes defined by the software. In addition or as an alternative, the computer system can provide functionality as a result of logic hardwired or otherwise embodied in a circuit (for example: accelerator (2044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

ASIC: Application-Specific Integrated Circuit
BMS: Benchmark Set
CANBus: Controller Area Network Bus
CBF: Coded block flag
CCLM: Cross-component Linear Model
CD: Compact Disc
CPUs: Central Processing Units
CRT: Cathode Ray Tube
CTBs: Coding Tree Blocks
CTUs: Coding Tree Units
CU: Coding Unit
DT: Dual Tree
DVD: Digital Video Disc
FPGA: Field Programmable Gate Areas
GOPs: Groups of Pictures
GPUs: Graphics Processing Units
GSM: Global System for Mobile communications
HDR: high dynamic range
HEVC: High Efficiency Video Coding
HRD: Hypothetical Reference Decoder
IC: Integrated Circuit
ISP: Intra Sub-Partitions
JVET: Joint Video Exploration Team
LAN: Local Area Network
LCD: Liquid-Crystal Display
LTE: Long-Term Evolution
MPM: most probable mode
MV: Motion Vector
JEM: joint exploration model
OLED: Organic Light-Emitting Diode
PBs: Prediction Blocks
PCI: Peripheral Component Interconnect
PLD: Programmable Logic Device
PU: Prediction Unit
QP: Quantization Parameter
RAM: Random Access Memory
ROM: Read-Only Memory
SBT: Sub-block transform
SDR: standard dynamic range
SEI: Supplementary Enhancement Information
SNR: Signal Noise Ratio
SSD: Solid-State Drive
TU: Transform Unit
USB: Universal Serial Bus
VUI: Video Usability Information
VVC: Versatile Video Coding
WAIP: Wide-Angle Intra Prediction While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding performed in a video decoder, comprising:
   receiving a syntax element from a bitstream of a coded video indicating whether residual blocks of a current coding unit (CU) are processed with a color space conversion, the residual blocks of the current CU including a luma residual block, a first chroma residual block, and a second chroma residual block;
   in response to receiving the syntax element indicating that the residual blocks of the current CU are processed with the color space conversion, applying, based on a transform skip flag corresponding to each of the residual blocks of the current CU having a value of 1 and a quantization parameter (QP) corresponding to each of the residual blocks of the current CU having a value of 4, an inverse color space conversion using a first option of color space conversion equations to the residual blocks of the current CU to generate modified versions of the residual blocks of the current CU, wherein
   the first option of the color space conversion equations includes:

$$\text{tmp}=rY[x][y]-(rCb[x][y]>>1),$$

$rY[x][y]=\text{tmp}+rCb[x][y],$ $rCb[x][y]=\text{tmp}-(rCr[x][y]>>1),$ and $rCr[x][y]=rCb[x][y]+rCr[x][y];$ and inputs to the first option of the color space conversion equations include:
an array of luma residual samples of the luma residual block with elements rY[x][y],
an array of chroma residual samples of the first chroma residual block with elements rCb[x][y], and
an array of chroma residual samples of the second chroma residual block with elements rCr[x][y]; and
outputs from the first option of the color space conversion equations include:
a modified array of luma residual samples of the luma residual block with elements rY[x][y],
a modified array of chroma residual samples of the first chroma residual block with elements rCb[x][y], and
a modified array of chroma residual samples of the second chroma residual block with elements rCr[x][y].

2. The method of claim 1, further comprising:
in response to the first syntax element indicating that the residual blocks of the current CU are processed with the color space conversion, selecting one of two options of color space conversion equations, wherein
the two options of color space conversion equations include:
the first option of color space conversion equations, and
a second option of color space conversion equations including:

$\text{tmp}=rY[x][y]-(rCb[x][y]>>1),$ $rY[x][y]=\text{tmp}+rCb[x][y],$ $rCb[x][y]=\text{tmp}-(rCr[x][y]>>1),$ and $rCr[x][y]=rCb[x][y]+rCr[x][y];$ and inputs to the second option of the color space conversion equations include:
an array of luma residual samples of the luma residual block with elements rY[x][y],
an array of chroma residual samples of the first chroma residual block with elements rCb[x][y], and
an array of chroma residual samples of the second chroma residual block with elements rCr[x][y]; and
outputs from the second option of color space conversion equations include:
a modified array of luma residual samples of the luma residual block with elements rY[x][y],
a modified array of chroma residual samples of the first chroma residual block with elements rCb[x][y], and
a modified array of chroma residual samples of the second chroma residual block with elements rCr[x][y].

3. The method of claim 2, wherein the selecting one of the two options of the color space conversion equations includes:
selecting the second option of the color space conversion equations when at least one of transform skip flags corresponding to the residual blocks of the current CU has a value of 0.

4. The method of claim 2, wherein the selecting one of the two options of the color space conversion equations includes:
selecting the second option of the color space conversion equations when at least one of the QPs corresponding to the residual blocks of the current CU has a value not equal to 4.

5. The method of claim 2, further comprising:
receiving a second syntax element indicating only the first option of color space conversion equations is applied, the second syntax element is one of a slice level syntax element, a picture level syntax element, or a sequence level syntax element.

6. The method of claim 2, further comprising:
receiving a second syntax element indicating only the first option of color space conversion equations is applied irrespective of a value of a flag indicating whether transform and quantization are bypassed for residuals of a CU, the second syntax element is one of a slice level syntax element, a picture level syntax element, or a sequence level syntax element.

7. The method of claim 2, further comprising:
selecting one of the two options of the color space conversion equations for processing a CU according to a variable indicating whether a block-based differential pulse code modulation (BDPCM) is applied to the CU.

8. The method of claim 1, further comprising:
determining no color space conversion is applied to residual blocks of a CU when a bit depth of luma samples of the CU is different from a bit depth of chroma samples of the CU.

9. The method of claim 1, further comprising:
determining no color space conversion is applied to residual blocks of a CU when a bit depth of luma samples of the CU is different from a bit depth of chroma samples of the CU, and a transform skip flag corresponding to each of the residual blocks of the CU has a value of 1 or 0.

10. The method of claim 1, further comprising:
determining no color space conversion is applied to residual blocks of a CU when a bit depth of luma samples of the CU is different from a bit depth of chroma samples of the CU, the a QP corresponding to each of residual blocks of the CU has a value of 4, and a transform skip flag corresponding to each of the residual blocks of the CU has a value of 1 or 0.

11. An apparatus of video decoding, comprising circuitry configured to:
receive a first syntax element from a bitstream of a coded video indicating whether residual blocks of a current coding unit (CU) are processed with a color space conversion, the residual blocks of the current CU including a luma residual block, a first chroma residual block, and a second chroma residual block;
in response to the first syntax element indicating that the residual blocks of the current CU are processed with the color space conversion, apply, based on a transform skip flag corresponding to each of the residual blocks of the current CU having a value of 1 and a quantization parameter (QP) corresponding to each of the residual blocks of the current CU having a value of 4, an inverse color space conversion using a first option of color space conversion equations to the residual blocks of the current CU to generate modified versions of the residual blocks of the current CU, wherein the first option of the color space conversion equations includes:

$\text{tmp}=rY[x][y]-(rCb[x][y]>>1),$ $rY[x][y]=\text{tmp}+rCb[x][y],$ $rCb[x][y]=\text{tmp}-(rCr[x][y]>>1)$, and $rCr[x][y]=rCb[x][y]+rCr[x][y]$; and inputs to the first option of the color space conversion equations include:
    an array of luma residual samples of the luma residual block with elements rY[x][y],
    an array of chroma residual samples of the first chroma residual block with elements rCb[x][y], and
    an array of chroma residual samples of the second chroma residual block with elements rCr[x][y]; and
outputs from the first option of the color space conversion equations include:
    a modified array of luma residual samples of the luma residual block with elements rY[x][y],
    a modified array of chroma residual samples of the first chroma residual block with elements rCb[x][y], and
    a modified array of chroma residual samples of the second chroma residual block with elements rCr[x][y].

12. The apparatus of claim 11, wherein the circuitry is further configured to:
    in response to the first syntax element indicating that the residual blocks of the current CU are processed with the color space conversion, select one of two options of color space conversion equations, wherein
    the two options of color space conversion equations include:
        the first option of color space conversion equations, and
        a second option of color space conversion equations including:

$\text{tmp}=rY[x][y]-rCb[x][y]$, $rY[x][y]=rY[x][y]+rCb[x][y]$, $rCb[x][y]=\text{tmp}-rCr[x][y]$, and $rCr[x][y]=\text{tmp}+rCr[x][y]$, inputs to the second option of the color space conversion equations include:
        an array of luma residual samples of the luma residual block with elements rY[x][y],
        an array of chroma residual samples of the first chroma residual block with elements rCb[x][y], and
        an array of chroma residual samples of the second chroma residual block with elements rCr[x][y]; and
    outputs from the second option of color space conversion equations include:
        a modified array of hum residual samples of the luma residual block with elements rY[x][y],
        a modified array of chroma residual samples of the first chroma residual block with elements rCb[x][y], and
        a modified array of chroma residual samples of the second chroma residual block with elements rCr[x][y].

13. The apparatus of claim 12, wherein the circuitry is further configured to:
    select the second option of the color space conversion equations when at least one of transform skip flags corresponding to the residual blocks of the current CU has a value of 0.

14. The apparatus of claim 12, wherein the circuitry is further configured to:
    select the second option of the color space conversion equations when at least one of the QPs corresponding to the residual blocks of the current CU has a value not equal to 4.

15. A non-transitory computer-readable medium storing instructions that, when executed by a processor, cause the processor to perform a method of video decoding, the method comprising:
    receiving a first syntax element from a bitstream of a coded video indicating whether residual blocks of a current coding unit (CU) are processed with a color space conversion, the residual blocks of the current CU including a luma residual block, a first chroma residual block, and a second chroma residual block;
    in response to the first syntax element indicating that the residual blocks of the current CU are processed with the color space conversion, applying, based on a transform skip flan corresponding to each of the residual blocks of the current CU having a value of 1 and a quantization parameter (QP) corresponding to each of the residual blocks of the current CU having a value of 4, an inverse color space conversion using a first option of color space conversion equations to the residual blocks of the current CU to generate modified versions of the residual blocks of the current CU, wherein, $\text{tmp}=rY[x][y]-(rCb[x][y]>>1)$, $rY[x][y]=\text{tmp}+rCb[x][y]$, $rCb[x][y]=\text{tmp}-(rCr[x][y]>>1)$, and $rCr[x][y]=rCb[x][y]+rCr[x][y]$; and inputs to the first option of the color space conversion equations include:
    an array of luma residual samples of the luma residual block with elements rY[x][y], an array of chroma residual samples of the first chroma residual block with elements rCb[x][y], and an array of chroma residual samples of the second chroma residual block with elements rCr[x][y]; and
    outputs from the first option of the color space conversion equations include:
        a modified array of luma residual samples of the luma residual block with elements rY[x][y],
        a modified array of chroma residual samples of the first chroma residual block with elements rCb[x][y], and
        a modified array of chroma residual samples of the second chroma residual block with elements rCr[x][y].

* * * * *